US012593093B2

(12) United States Patent
Shaw et al.

(10) Patent No.: US 12,593,093 B2
(45) Date of Patent: *Mar. 31, 2026

(54) SYSTEMS AND METHODS FOR SYNCHRONIZING REMOTE MEDIA STREAMS

(71) Applicant: TogetherSound LLC, St. Louis, MO (US)

(72) Inventors: Brian Shaw, Napa, CA (US); Steve Melnick, St. Louis, MO (US)

(73) Assignee: TogetherSound LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,979

(22) Filed: Sep. 29, 2023

(65) Prior Publication Data

US 2024/0031636 A1 Jan. 25, 2024

Related U.S. Application Data

(63) Continuation of application No. 17/853,865, filed on Jun. 29, 2022, now Pat. No. 11,800,177.

(51) Int. Cl.
*H04N 21/43* (2011.01)
(52) U.S. Cl.
CPC .............................. *H04N 21/43072* (2020.08)
(58) Field of Classification Search
None
See application file for complete search history.

(56) References Cited

U.S. PATENT DOCUMENTS

| | | | |
|---|---|---|---|
| 11,405,448 B1 * | 8/2022 | Seigneurbieux | ...... H04L 65/612 |
| 2020/0186575 A1 | 6/2020 | Rofe et al. | |
| 2021/0135896 A1 | 5/2021 | Ghanaie-Sichanie et al. | |
| 2021/0365234 A1 * | 11/2021 | Ur | ...................... G10L 21/0208 |

OTHER PUBLICATIONS

International Search Report and Written Opinion issued is U.S. Appl. No. 18/374,979, dated Nov. 13, 2023.
International Search Report and Written Opinion issued in International Patent Application No. PCT/US2023/026652, dated Nov. 13, 2023.

* cited by examiner

*Primary Examiner* — Omar S Parra
(74) *Attorney, Agent, or Firm* — Pierson Ferdinand LLP; Daniel Rose

(57) ABSTRACT

The present disclosure describes systems and methods for dynamic synchronization of media streams from remote users. A latency matrix between all participants is generated and participants within acceptable synchronization windows are grouped together. Earlier media streams are buffered and started in synchronization with later streams locally at each client device. To provide an improved experience for earlier or lower-latency clients, additional media streams may be generated (e.g. synthesized, played back from recordings, or dynamically generated based on locally input media). Accordingly, each user is provided with a collaborative experience in substantial synchronization.

25 Claims, 16 Drawing Sheets

Participant A
generated media
50

Participant
A

Time

T0

Participant B
generated
media 52

Participant
B

Time

T0

Participant C
generated
media 60

Participant
C

Time

T0                    T3    56'

Participant D
generated
media 62

Local buffering 58

Participant
D

Time

T0                    T4

Acceptable range 56

Destination

| X | A | B | C | D | E |
|---|---|---|---|---|---|
| A | - | 5 | 25 | 10 | 30 |
| B | 8 | - | 10 | 45 | 60 |
| C | 20 | 12 | - | 30 | 75 |
| D | 15 | 35 | 35 | - | 15 |
| E | 35 | 55 | 60 | 20 | - |

Source

Latency (ms)

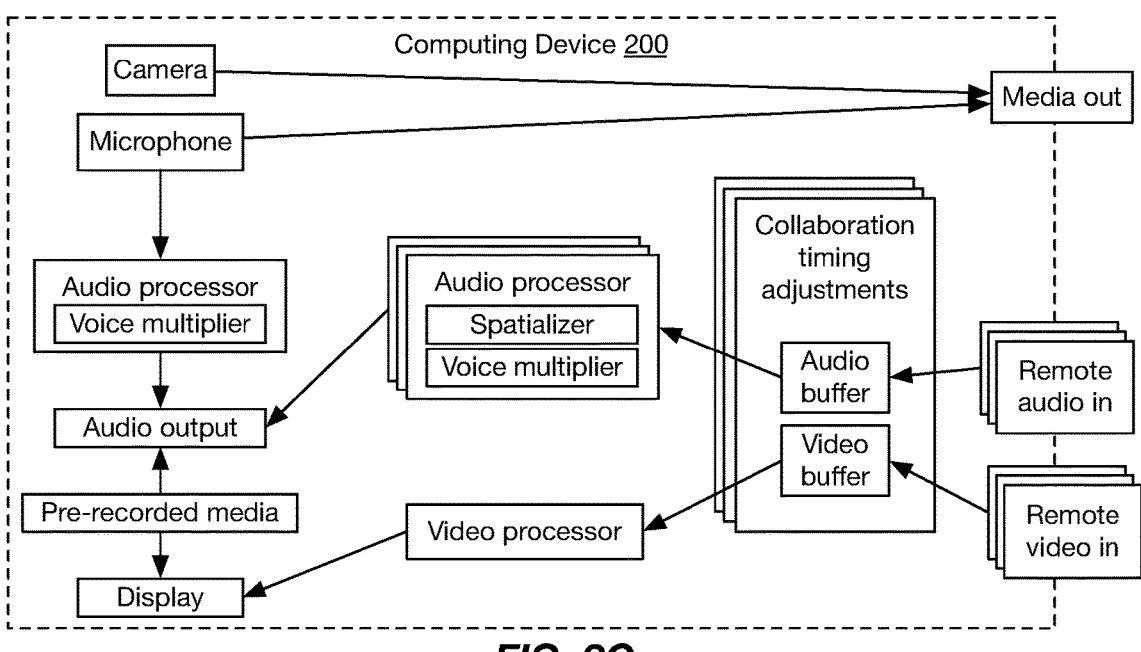

FIG. 2C

Collaboration Setup

Users join event/ collaboration

Establish peer connections

Measure latency and share with server/devices

Identify user preferences/ role/priority and latency

Determine stream selections, offsets

Determine audio processing parameters

Collaboration Processing

Local media

Selected remote media

Prerecorded media

Reference start time coordination

Voice multiplication

Audio attenuation, filtering, etc.

3D audio spatialization and room simulation

Output

FIG. 2D

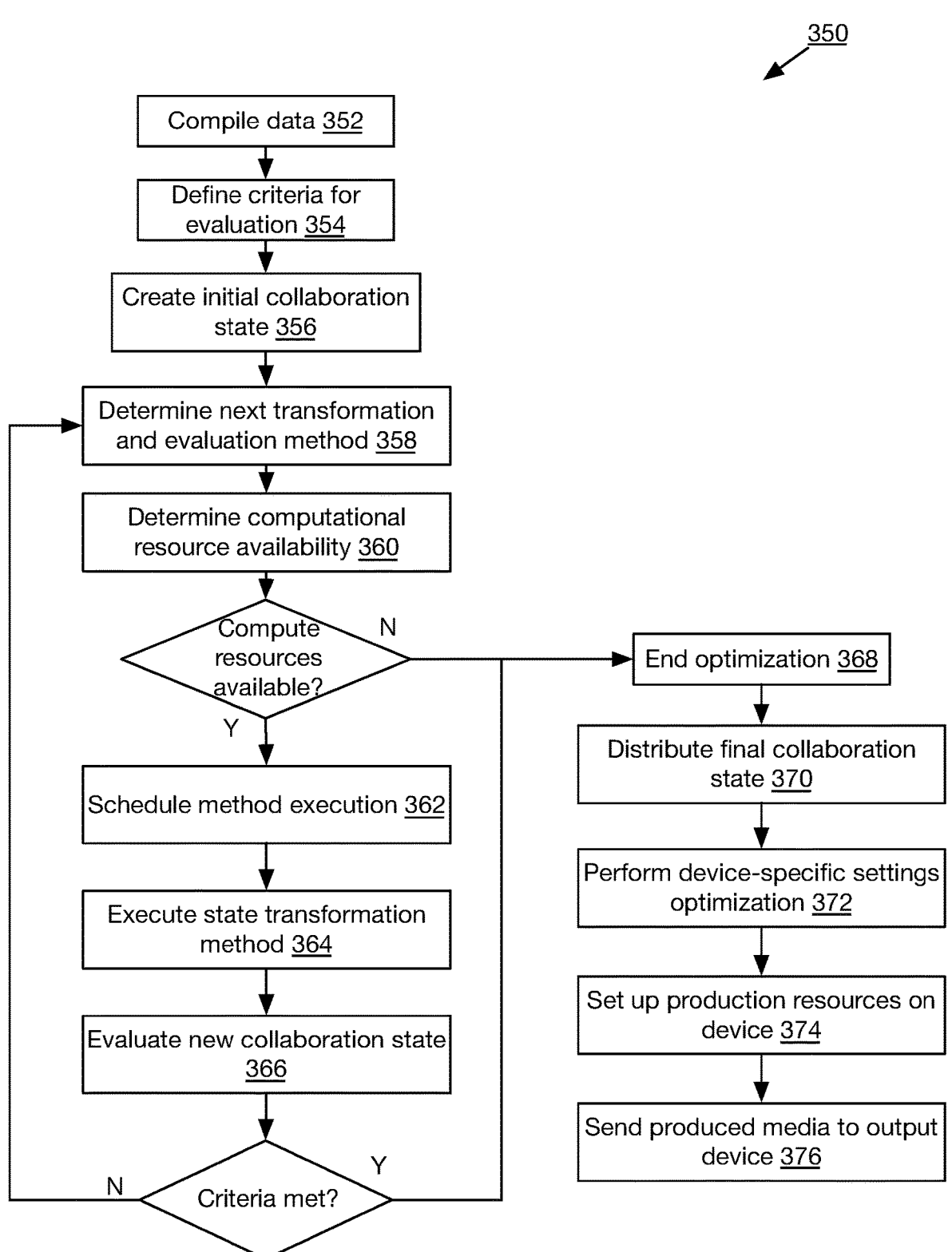

_350_

Compile data 352

Define criteria for evaluation 354

Create initial collaboration state 356

Determine next transformation and evaluation method 358

Determine computational resource availability 360

Compute resources available?

N → End optimization 368

Distribute final collaboration state 370

Perform device-specific settings optimization 372

Set up production resources on device 374

Send produced media to output device 376

Y

Schedule method execution 362

Execute state transformation method 364

Evaluate new collaboration state 366

Criteria met?

SYSTEMS AND METHODS FOR SYNCHRONIZING REMOTE MEDIA STREAMS

RELATED APPLICATIONS

The present application claims the benefit of and priority as a continuation to U.S. Nonprovisional patent application Ser. No. 17/835,865, entitled "Systems and Methods for Synchronizing Remote Media Streams," filed Jun. 29, 2022, the entirety of which is incorporated by reference herein.

BACKGROUND

Telecommunications via the Internet suffer from latency in the transmission paths between devices as well as in processing latencies within each device encoding and decoding media streams, such as audio and/or video. For typical spoken dialogue and/or video communications, latencies even up to a second or longer may be mostly irrelevant as speech tends to be half-duplex in nature (e.g. with one person pausing while another speaks). However, collaborative activities such as singing and/or playing music require significant synchronization. With a not-unusual song tempo of 120 beats per minute, a second long delay results in missing two full beats. Typical efforts to collaborate over the Internet require asynchronous recording and manually editing together parts, which can take significant time and effort and lose the "live" or interactive nature of collaboration.

SUMMARY

The present disclosure is directed to systems and methods for dynamic synchronization of media streams from remote users. A latency matrix between all participants is generated and participants within acceptable synchronization windows are grouped together. Earlier media streams are buffered and started in synchronization with later streams locally at each client device. To provide an improved experience for some clients, additional media streams may be generated (e.g. synthesized, played back from recordings, or dynamically generated based on locally input media). Accordingly, each user is provided with a collaborative experience in substantial synchronization.

BRIEF DESCRIPTION OF THE FIGURES

FIG. 2C is a block diagram illustrating media flow within a system for collaborative media, according to some implementations;

FIG. 2D is a block diagram illustrating setup and processing flows within a system for collaborative media, according to some implementations;

FIGS. 3B-3C are flow charts of methods of optimizing media stream playback, according to some implementations.

In the drawings, like reference numbers generally indicate identical, functionally similar, and/or structurally similar elements.

DETAILED DESCRIPTION

Figure 1A:
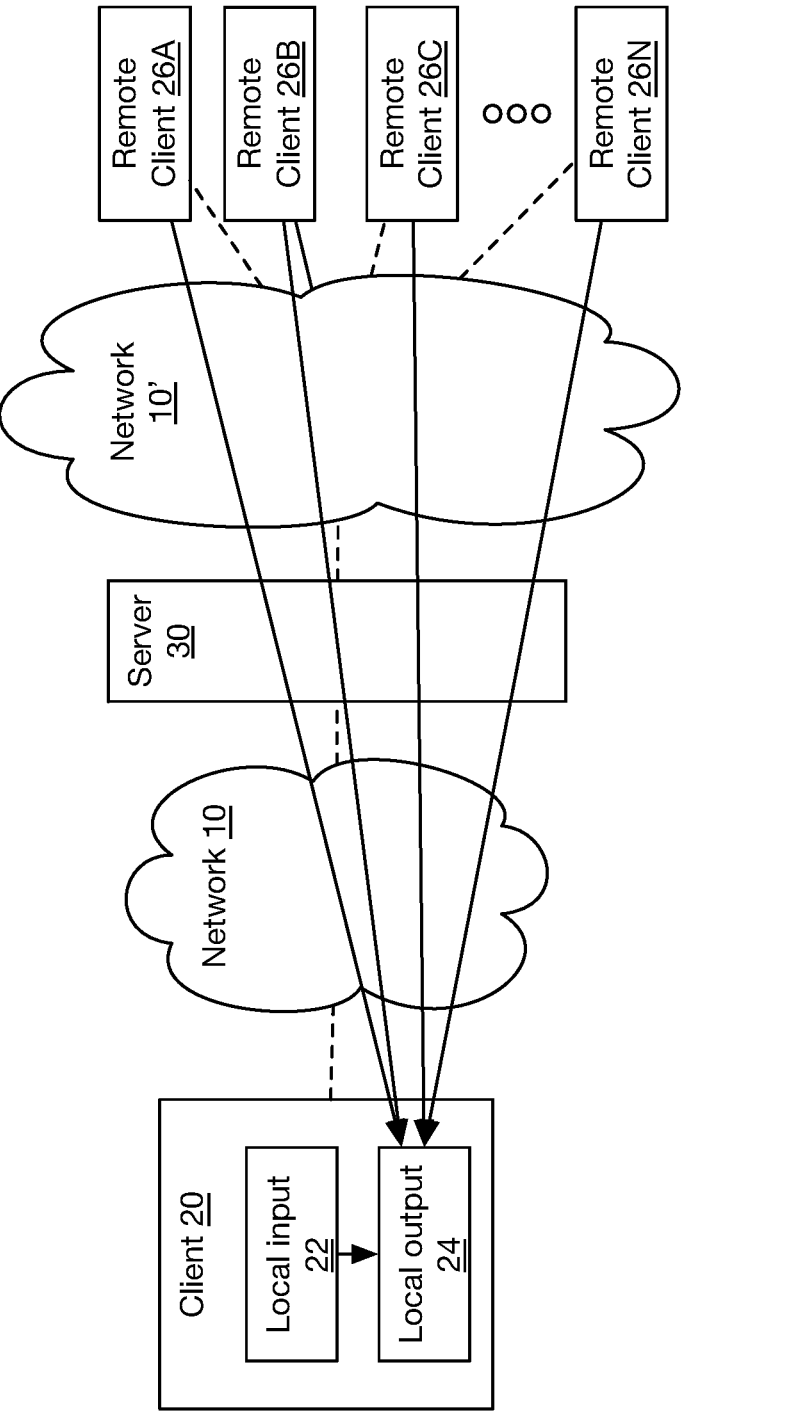
FIG. 1A is a block diagram of a computing environment, according to some implementations.

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Collaborative events provide more intense experiences for users, such as singing in groups or making music together, as well as other synchronized actions such as chanting, orchestrated meditation, or other acts. Humans are sensitive to audio synchronization differences greater than approximately 35 milliseconds (sometimes referred to as the echo threshold, below which the Haas effect is experienced and discrete sounds are perceived as a single event), and visual differences greater than approximately 80-120 milliseconds (sometimes referred to as the flicker fusion rate). In live environments, participants naturally adjust their timing or cadence of speech or music to synchronize with others, and transmission times (e.g. the speed of sound through air) are relatively negligible in most environments (e.g. in which participants are separated by meters or tens of meters, resulting in propagation delays on the order of milliseconds or tens of milliseconds). While such collaboration and synchronization may be trivial in person, communications over data networks add significant latency that makes synchronization of audio and video between users difficult if not impossible, particularly for geographically remote participants.

Current video conferencing technologies allow for group communications over large distances, but lack synchronization and transmission delays may be significant. In particular, many videoconferencing tools are optimized for discussions with one person speaking at a time (and may in many implementations mute or suppress other speakers to avoid confusions, echoes, etc.). These tools lack the ability to time align each participant's sonic experience, which is essential for people trying to read, chant, sing, or perform other activities in synchronization or collaboration with other participants. For example, if two remote users of a video conferencing program with a one second delay attempt to sing a song together, such as "Happy Birthday" (typically sung at approximately 120 bpm), each user may hear the other two beats behind them, even if they start together. As noted above, if each tries to slow to match the other (or at least their perception of the other's singing), the synchronization errors may get even worse.

Some implementations of teleconferencing applications include time compression during silences to reduce latency. Conversation has natural pauses which allow lagging data to "catch up", reducing apparent pauses between speakers. However, even with such optimization, conversations on any typical network will yield uncomfortable pauses or "stepping-on" other speakers (or worse, with high latency technology configurations). Accordingly, while such implementations of teleconferencing applications may be adequate for half-duplex communications or back-and-forth dialogue, they may be unusable for simultaneous or synchronized communications or collaborative media.

Other attempts at providing remote collaborations (e.g. such as music production between remote users) include the use of dedicated high-speed, low-latency networks (e.g. fiber optic networks, and specialized low-latency encoding and decoding hardware). The expense and complexity of establishing such networks typically results in severe geographic limitations (e.g. between buildings on a university campus, rather than across the country), as well as limiting access from some participants due to affordability and/or skillset limitations. In some implementations, local delays may be used to "dial in" latencies to time-align upstream performers. However, in such implementations, those upstream (earlier) performers cannot hear later performers. Other approaches give up any attempt at real-time synchronization, and instead utilize a metronome or "click-track" or a pre-recorded reference track and each participant's performance is recorded separately while listening to the pre-recorded reference or metronome for subsequent manual alignment and mixing. For example, most televised or online events showing remote members of bands or orchestras performing "together" (with a post-produced video where participants appear to be performing simultaneously) use production techniques after the fact to make the events appear to be simultaneous. In a similar implementation, a collaboration may be "built" over time without concern for latency or any attempt at real-time collaboration, with each successive collaborator adding their contribution on their own and forwarding the result to subsequent collaborators (e.g. as in TikTok duets or similar asynchronously contributed collaborations).

Instead, implementations of the systems and methods discussed herein provide dynamic synchronization of media streams from remote users, vastly improving the experience for remote individuals participating in real-time, synchronized audio and/or visual experiences. These systems and methods allow for real-time events with near-simultaneous participation between geographically remote participants using network connected devices, with each contributing media (e.g. audio, video, vocals, music, data, etc.) to a collaboration, and each able to hear the contributions of other participants during the collaboration. Other information may be incorporated, such as location information, user information, avatar information (e.g. for 3D environments), or any other type and form of information.

Each participant may experience an individualized, unique version of the collaborative event, comprising other participants' contributions based on their relative latency among other factors. For example, in many implementations, participants within acceptable synchronization windows may be grouped together (with contributions that are outside of acceptable latency parameters being excluded). Earlier media streams may be buffered, modified, or processed in various ways, and started in synchronization or near synchronization (e.g. within a predetermined range, such as 30 ms, 50 ms, 100 ms, or any appropriate time range, based on user preferences, song tempos, etc.) with later streams locally at each client device. Thus, each participant will hear a unique mix of contributions, and a unique processing of those contributions, in substantial synchronization resulting in an improved collaborative experience. The controlled timing eliminates the cascade of slowing tempo typical of other teleconferencing systems. Rather, media streams received within a sufficient latency window may be played to a participant, with earlier-received streams buffered appropriately to provide synchronization, and later-received streams excluded to avoid slowdowns and desynchronization. In some implementations, media streams may be spatially processed to provide a more natural environment. Other processing may be utilized in various implementations, including equalization, attenuation, reverberation, synthesis, filtering, or other processing functions. To provide an improved experience for earlier or lower-latency clients or other clients, in some implementations, additional media streams may be generated (e.g. synthesized, played back from recordings, or dynamically generated based on locally input media or remote media streams or pre-recorded media streams). Accordingly, each user is provided with a collaborative experience in substantial synchronization.

Briefly referring to FIG. 1A, illustrated is a block diagram of a computing environment, according to some implementations. As shown, a client device 20 may communicate via one or more networks 10, 10' (referred to generally as network 10) with one or more remote client devices 26A-26N (referred to generally as remote client(s) 26). As shown, in many implementations, network 10 may comprise one or more networks or combinations of networks, such as local area networks (LANs), wide area networks (WANs) such as the Internet, cellular networks, satellite networks, broadband networks, or any other type and form of network. In other implementations, network 10, 10' may be combined in a single network. In many implementations, communications between client 20 and remote clients 26 may be via a server 30 or managed by a server 30, which may comprise one or more computing devices (e.g. cloud computing devices, video conferencing servers, etc.). A local output 24 (e.g. headphones, speakers, monitors, etc.) of a client device 20 may provide a combined output from remote client devices 26 and, in some implementations, from a local input 22 (e.g. microphone, camera, etc.). In some implementations as shown, communications between remote clients 26 and/or client 20 may flow via server 30 (e.g. with server 30 acting as an intermediary and forwarding or retransmitting communications between the clients). In other implementations, communications between remote clients 26 and/or client 20 may not flow through the server 30 (e.g. instead using a mesh or peer-to-peer network).

Figure 1B:
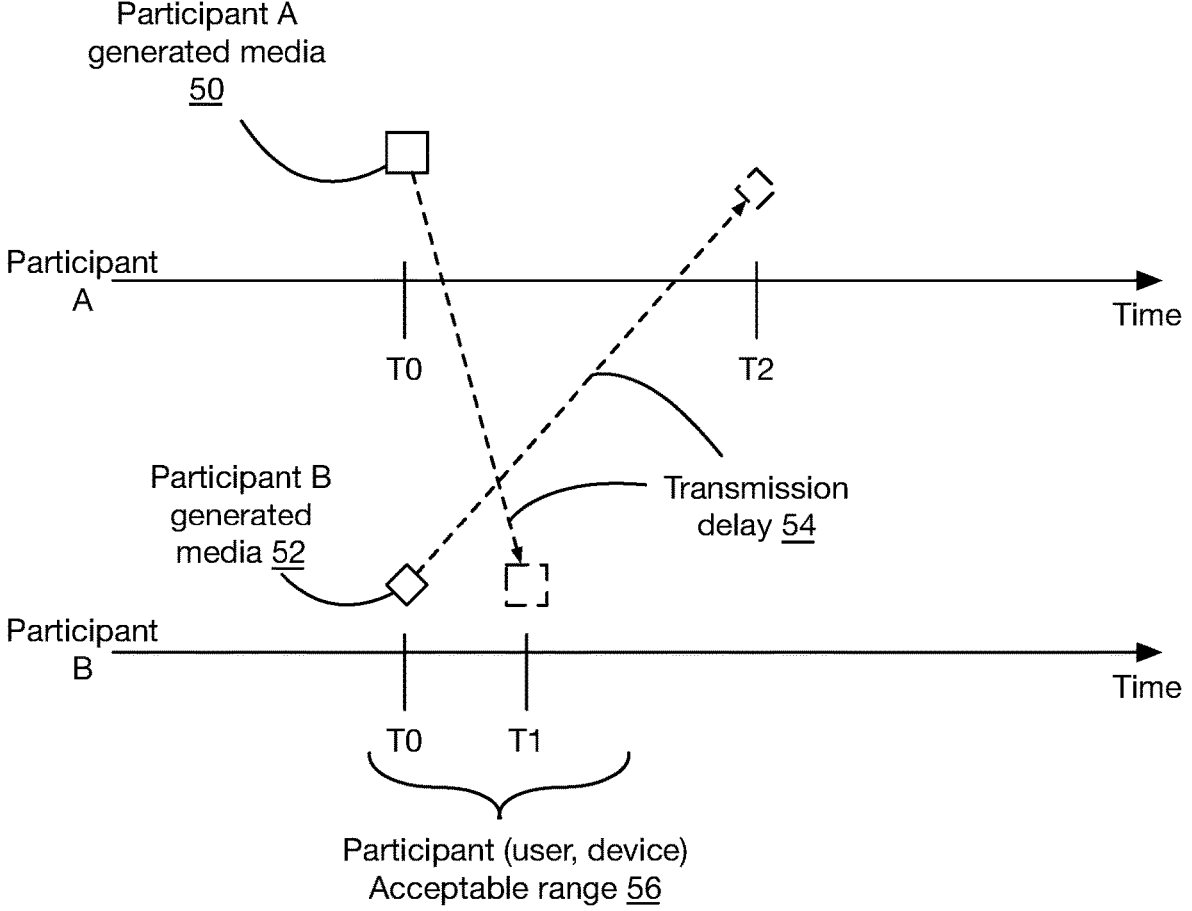
FIGS. 1B-1E are illustrations of communications exchange between client devices over time, according to some implementations.

FIG. 1B-1E are illustrations of communications exchange between client devices over time, according to some implementations. Referring first to FIG. 1B, illustrated are example timelines for two participants, participant A and participant B. In the example of FIG. 1B, each participant generates a media stream 50, 52 starting at a given time TO that is provided to the other participant (with transmission delay 54 shown in dashed line). As shown, the media stream of participant A 50 arrives at participant B's device at time T1, while the media stream of participant B 52 arrives at participant A's device at time T2. As discussed above, discrete audio events that occur within a short time frame (e.g. typically less than 35 ms, though this varies with the individual) may be perceived as a single event. The time frame may be referred to as an acceptable range 56, temporal window, synchronization window, or by similar terms. As shown, the acceptable range 56 may extend prior to T0, such that playback of participant A's generated media 50 at a time prior to T0 may be perceived by participant B as in synchronization with their own generated media or physical actions presented visually (e.g. spoken word, sung lyrics, played music, etc.) at time T0. Acceptable ranges 56 may be different for different users and/or environments and may be customized for each participant. For example, a first participant may be more sensitive to delays than another participant, or the first participant may be listening in a large room with speakers at some distance (adding acoustic delay) while another participant may be listening on headphones. In another example, a participant may be accustomed to leading a group (e.g. as a soloist, section leader, by personal preference or style, etc.) and accordingly may have a longer or later acceptable range than a participant accustomed to following a group or leader. Accordingly, different acceptable ranges may be used for different participants, groups of participants, devices, etc. Additionally, acceptable ranges may vary for a single participant based on context (e.g., physical environment, virtual environment, identities or roles of other participants, etc.). Accordingly, an acceptable range may be different for each session, even for a single participant. Acceptable ranges may be dynamically set, manually set, set explicitly (e.g., "−10 to +45 ms") or set implicitly (e.g., "a little longer than the previous setting") in various implementations.

As discussed above, in the example of FIG. 1B, participant A's media 50 arrives at the device of participant B within the acceptable range 56 and accordingly in some implementations, may be presented (e.g. played back, rendered, decoded, etc.) to participant B as participant B generates their own media 52. Although not perfectly synchronized, because the media arrives within the acceptable range, participant B will perceive the media 50 as substantially synchronized, providing a collaborative experience. In some implementations, participant A's media 50 may be processed to further enhance participant B's perception of synchronization (e.g. by placing the media source within a virtual audio environment at a distance corresponding to the transmission delay 54, such that participant B perceives the media as coming from a geographically proximate participant).

Conversely, participant B's media 52 arrives at participant A's device too late (e.g. outside of the acceptable range 56) and may not be played back for participant A. This avoids the cascading slow-down problem of mutual delays in teleconferencing implementations, as participant A will not be thrown off by delayed playback of participant B's media. While participant A does not get the full benefit of the collaborative experience in this example, other features may be utilized to enhance participant A's experience, discussed in more detail below. Additionally, with other participants involved, participant A may receive media streams from other, earlier participants, again enhancing participant A's experience.

Figure 1C:
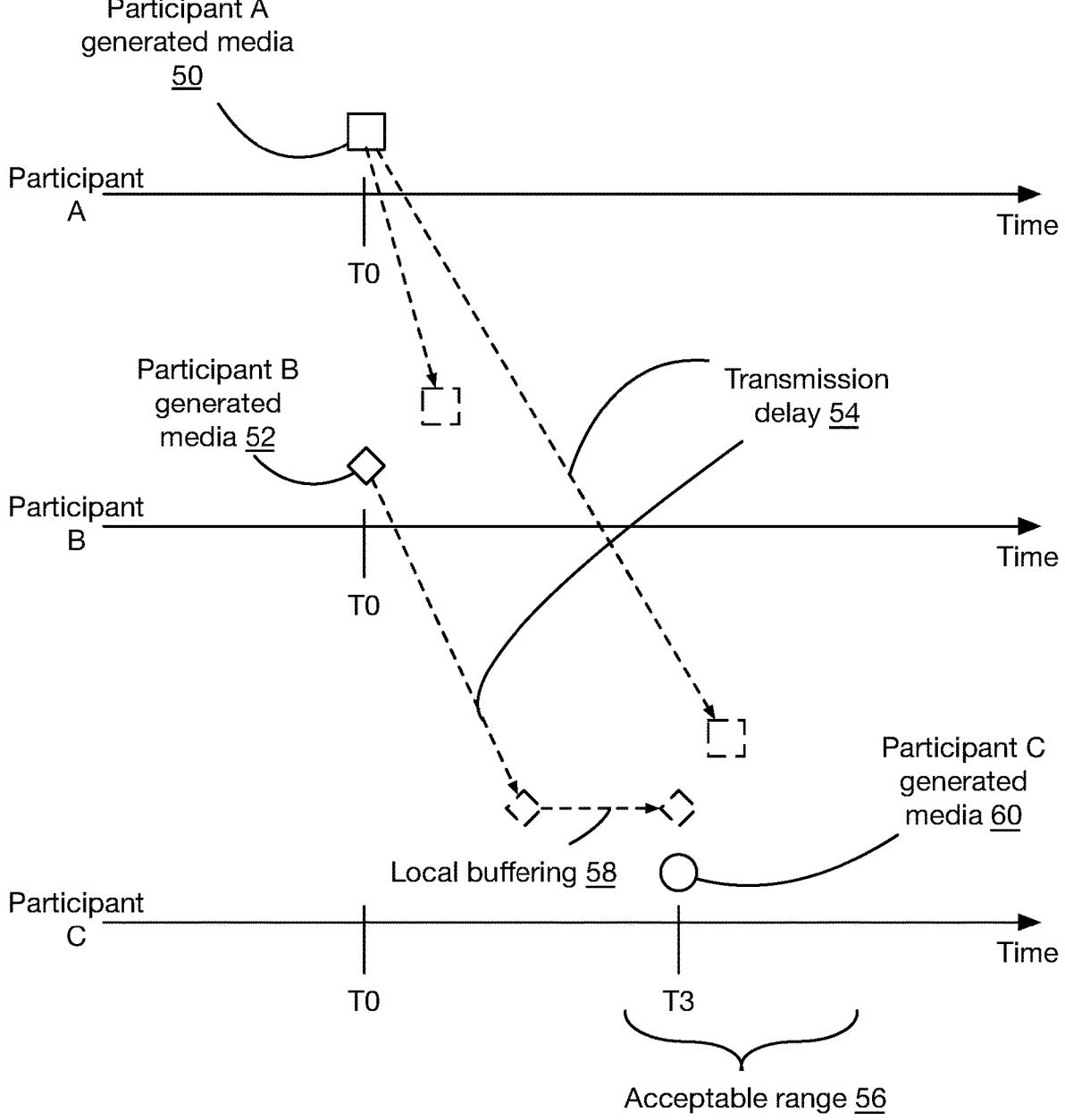

FIG. 1C expands on the example of FIG. 1B with a third participant C, who generates a media stream 60. This stream is generated at time T3, corresponding roughly to when participant A's generated media 50 arrives at participant C's client device and is available for playback. Participant B's media stream 52, which arrived earlier, may be stored in a local buffer 58 for playback along with participant A's media stream 50 (and the locally generated stream 60 of participant C) or at any media timing offset identified as optimal for participant C's experience (e.g. slightly before C's local timing offset, slightly after C's local timing offset, etc.). The local timing offset for participant C (e.g. T3) may be predetermined based on measurements of the transmission delays 54 and in many implementations may be provided to participant C (e.g. via a visual indicator or countdown, an audio indicator, or other notification of when to start), allowing participant C to begin singing, speaking, playing an instrument, or otherwise acting in what they perceive to be complete synchronization with participants A and B. As discussed in more detail below, in many implementations, other factors beyond latency or transmission delay may be utilized to determine local timing offsets and media timing offsets, including participant or stream type, cohort, vocal part, instrument, social connections (e.g. so that participants can preferentially hear their friends). Overall goals may also be considered such as minimizing the total elapsed time of the collaboration. This may be particularly important for earlier participants, for example, who may finish a session long before a later participant who has a greater local timing offset. Other goals considered may include maximizing the number of voices heard, maximizing the number of voices heard in near synchronization, maximizing synchronization among socially connected participants or groups, etc.

Local timing offsets may represent the time of a participant's perceived experience of a collaboration relative to a synchronized time. The synchronized time may be shared among all participants or devices in a collaboration, and may be based on a network time source or GPS clock, for example. Each device may synchronize its local time with others during a handshaking or synchronization process prior to the collaboration, such as by one device broadcasting a synchronization clock or by each device measuring a difference between a local timestamp and a network timestamp. Local timing offsets may be relative to the synchronized time, in many implementations, such as one second, 200 milliseconds, 5 milliseconds, or any other such value. Media sources may be played out by a local device with a timing offset. In many instances, the media timing offset may match the local timing offset (or equal to the synchronized time plus the offset, depending on format). In other instances, the media timing offset may be slightly different, allowing the source to lead or follow the local participant (e.g. 50 milliseconds ahead of the local timing offset, or 75 milliseconds after the local timing offset). A media timing offset may also be affected by other processing, such as spatialization (which may add a virtual acoustic latency or delay) or similar effects.

Figure 1D:
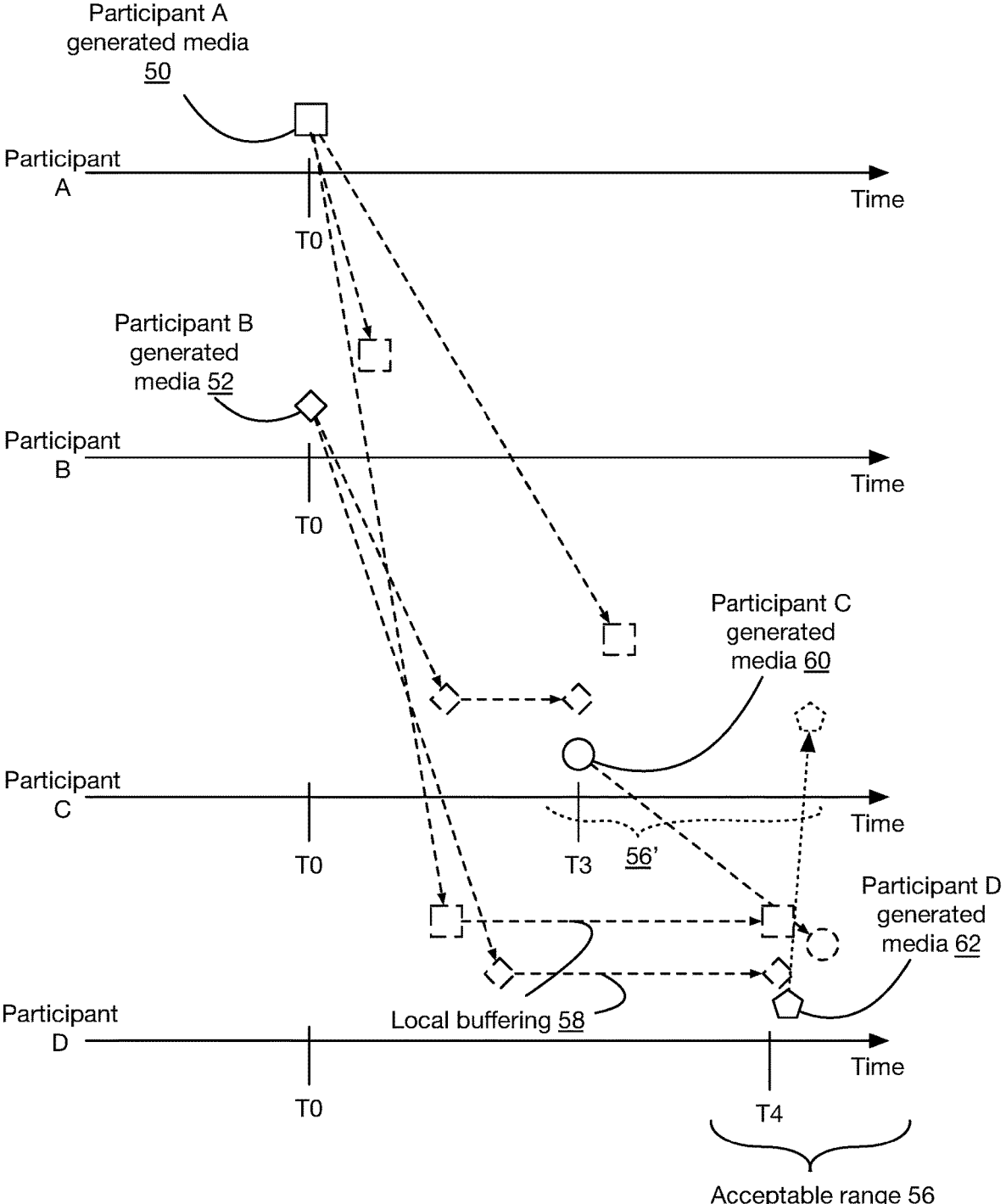

FIG. 1D similarly expands on the example of FIG. 1C with a fourth participant D. As with participant C, participant is assigned a local timing offset (e.g. time T4) based on the transmission delay measurements (e.g. as early as possible, but late enough for participant C's generated media stream 60 to arrive at the device of participant D). The media streams of participants A and B 50, 52, which arrived earlier, may be locally buffered for playback at T4 along with the received stream 60 from participant C and locally generated media 62 from participant D.

Accordingly, via the example implementations shown in FIGS. 1B-1D, participants B, C, and D all experience the collaborative event with media streams of one or more other participants, uniquely synchronized for that participant (e.g. starting at T0, T3, or T4 respectively, with all media streams played back within an acceptable range 56 or temporal window based on the local timing offset for the receiving participant). Although to an outside observer, the participants are not in synchronization, each participant has an individually synchronized collaborative experience. This synchronization process occurs quickly and in real-time, enhancing the simultaneity of the collaboration the perception of overall coordination among participants.

Figure 1E:
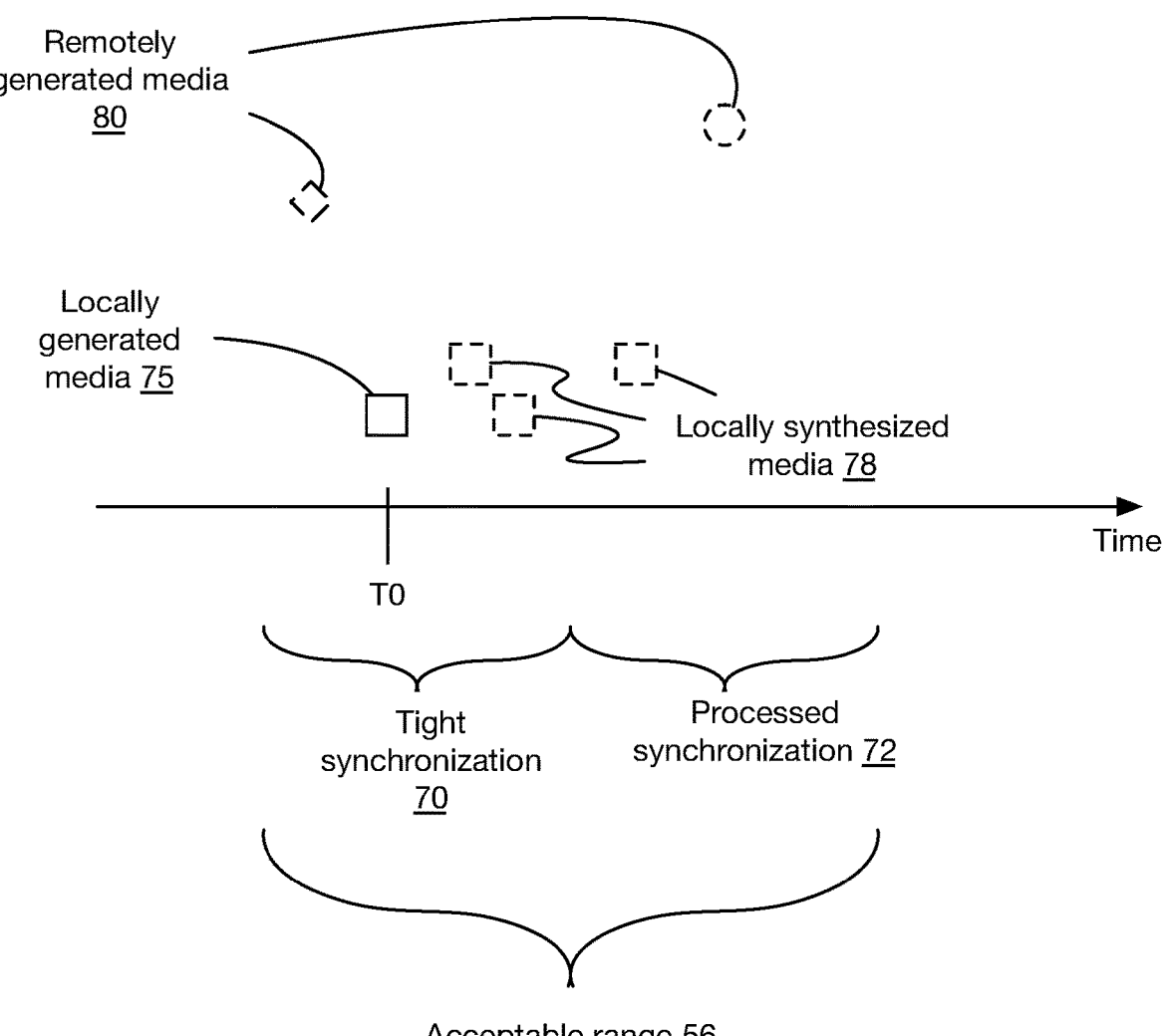

In many implementations, the acceptable range 56 may be divided into sub-ranges or temporal sub-windows. For example, FIG. 1E is an illustration of an example timeline of FIGS. 1B-1D enlarged to show detail within the temporal window 56. As discussed above, audible events or sounds occurring within a short time frame (e.g. less than 35 ms, in many instances, though this may vary by individual) may be perceived as coincident. For example, two sounds 20 milliseconds apart may be perceived as occurring simultaneously. This may be referred to as a "tight" synchronization range 70, and may represent a window of 20 ms, 30 ms, 40 ms or any similar duration in various implementations. However, the acceptable range 56 for apparent synchronization may extend beyond this range—that is, two participants speaking, singing, or playing instruments in near but non-exact synchronization may still be aesthetically acceptable to the participants, particularly with added processing (e.g. filtering, spatialization, reverberation, synthesis, mixing, or other such functions) of other participants' media. This extended synchronization range or portion of the acceptable range may be referred to as a processed synchronization range 72, and may extend from the tight synchronization range to 50 ms, 75 ms, 100 ms, 150 ms, 250 ms, or any other such value. For example, many large orchestras or choirs may stretch 35 meters (approximately 115 feet) from end to end when on stage. At typical room temperature and sea level, the speed of sound in air results in a propagation delay of 100 ms from a singer at one end of such a choir to a singer at the other end. Such a delay may be easily perceived (particularly when both singers are responding to visual cues from a conductor at the speed of light), but may nonetheless be acceptable, particularly depending on tempo. For example, at a fast 150 beats per minute, 100 ms delay is equivalent to a sixteenth note or semiquaver; at 75 beats per minute, this delay is equivalent to a thirty-second note or demisemiquaver. Such a delay may be effectively imperceptible relative to the durations of other notes within the song. The durations of note onset times or audio reverberation tails may similarly influence the perception of time alignment.

This effect of this extended synchronization range 72 may be similarly enhanced through processing, such as placing a source within a virtual environment at a corresponding distance from the listener (e.g. at a point 35 meters away, for a synchronization delay of 100 ms). This may allow the listener to interpret the near-synchronized media stream as being actually synchronized, but coming from a participant farther away in space, providing a realistic sense of togetherness and collaboration. Additional processing may include attenuation (e.g. based on the delay or corresponding distance), filtering (e.g. reducing amplitudes of higher frequencies or applying a low pass filter, in some implementations), adding reverb (helping to place the source at a distance within a larger environment), or any other such psychoacoustic processing. In many implementations, such processing may be more heavily applied for streams arriving towards the end of the processed synchronization window 72 (e.g. with greater attenuation or filtering) than for streams arriving earlier within this window, reducing the prominence (and distraction) of later streams that are more likely to impair the user experience. For example, attenuation may be applied from 0-100% in proportion to a starting playback time of a received media stream from the start to end of the processed synchronization window 72 (e.g. 0% attenuation for a stream with playback starting within 40 milliseconds of a local timing offset T0, up to 100% attenuation for a stream played back starting at 250 milliseconds after time T0). (In FIGS. 1B-D, T0 always represents the synchronized time which is common for all participants, but in FIG. 1E, T0 represents a local timing offset for a single participant which may or may not match the synchronized time.) As discussed in more detail below, processing may be applied based on other factors (including or not including latency), such as participant part or type, cohort type, content strength, social connections to other participants, media quality, or any other such factor. Furthermore, processing may be applied to streams within the tight synchronization window (or any window or portion of the range) to enhance the experience; accordingly, in many implementations, "tight" synchronization may merely imply that streams arriving in this range may require less processing or may be valued equally to streams in perfect synchronization.

While FIG. 1E shows two synchronization windows (or sub-windows or portions of the acceptable range 56), in some implementations, these windows may be further subdivided and/or additional windows may be included. For example, in one implementation, there may be a first window for tight synchronization, a second window for processed synchronization, and a third window for ambient synchronization or for playback of streams that would be considered out of synchronization but may be acceptable with sufficient large spatialization factors. For example, participants at either end of a very large choir may be separated by as much as 100 feet or more, resulting in 100 ms or longer acoustic delays; as soloists, this may be unacceptable for many participants, but with a large number of closer synchronized participants between them, the longer delay may be less noticeable; accordingly, in a similar virtual environment, a long delay for a few streams may be acceptable, particularly if many other participant streams have shorter delays. Synchronization windows or sub-windows (and acceptable ranges) may be different or the same for different participants, and may be adjusted based on user preferences, device capabilities, etc.

As discussed above, by generating unique local timing offsets and stream offsets according to transmission delays for media from participants with larger timing offsets, also referred to as later participants, and buffering media streams generated and received earlier, later participants may have a full collaborative experience. However, this may not work for media from participants with smaller timing offsets (e.g. participant A in the examples of FIGS. 1B-1D), also referred to as earlier participants, as they cannot receive media streams that have not yet been generated (and are outside of the acceptable range, discussed below). Instead, additional media streams may be generated, synthesized, or played back to earlier participants, making up some of the "missing" participants from their collaborative experience. Such streams may be variously referred to as derived streams or coming from a derived source (e.g. for a virtual source derived from an original media source such as a live stream or a recording, with additional processing applied in many implementations), or synthetic streams or coming from a synthetic source (e.g. for a virtual source generated without being based on another media source). For example, as shown in FIG. 1E, a locally generated media stream 75 may be duplicated and played back with varying delays (and, in many implementations, additional processing such as filtering, formant or pitch shifting, time slewing, or other such processing) to provide additional derived streams 78. Slight variations in pitch, timing, and tone of these additional streams (and particularly pitch and timing shifts that vary slightly over time) may result in the derived streams being perceived as coming from additional participants, even though they are all generated from the user's own locally generated media stream 75. In other implementations, additional media streams 75 may be synthesized (e.g. particularly for collaborative sessions with instruments) or may be pre-recorded (e.g. reference tracks, etc.). In some implementations, additional media streams may be generated with complementary pitch shifts (e.g. unison, perfect fourths or fifths, etc.) to provide harmony. A combination of recorded, derived, and synthesized or processed streams may be used in many implementations. Additional streams may be used to replace streams not played because they were outside of the acceptable delay range, or to representation additional voices or expand the perceived number of participants to the collaboration. Additionally, in some implementations, additional synthesized or generated streams may be combined with remotely generated and received media streams 80. In some implementations, the number of additional streams may be inversely proportional to the number of received media streams. For example, in some implementations, if only the locally generated stream is available, the system may generate up to a half dozen or more additional streams; however, if four or five remotely generated streams are available, only one or two additional streams may be generated. The total number of streams and/or proportion of real vs. generated or synthesized streams may be configured by a user or administrator, and may be applied on a per-user basis according to individual participants' preferences. In some implementations, the total number of streams and/or proportion of real vs. generated or synthesized streams may be dynamically calculated for a user and/or client device based on any number of factors including processing capabilities, RAM, battery power, past user preferences, similar user preferences, or any other such factor. In some implementations, the number of additional streams may be based on a percentage of total played streams (e.g., set equal to a predetermined percentage of the real participants, such as 10%, 20%, or any other such value). In some implementations, the additional voices may be added based on a type or cohort of participants having below a threshold number or percentage of the total number of participants (e.g. too few baritone vocalists, for example).

Additionally, while the examples of FIGS. 1A-1D primarily show earlier streams being provided to later participants and while later streams that are received outside of the acceptable range 56 may not be available for local playback, in many instances, streams may be technically later but arrive within the acceptable range 56 (including tight synchronization or processed synchronization windows). For example, referring back briefly to FIG. 1D, while the streams from participants A-C are provided to participant D for buffering and/or playback, if the stream from a later participant (e.g. participant D, with a media stream identified with a pentagon shape) may be received quickly enough by an earlier participant (e.g. participant C) that it may be played within an acceptable range 56' for that earlier participant (shown in small-dotted line), the later stream may be played by the earlier participant. While the later stream will lag behind their locally generated media stream, the delay may be acceptable (particularly with spatialization or other processing) such that the participants may collaborate. Accordingly, in such an example, participant C may receive and play streams from participants A (earlier, buffered), B (earlier, buffered), and D (later, processed), providing a larger degree of collaboration. This may occur even though participant C's local timing offset may be smaller than that of participant D.

As discussed above, in many implementations, a latency array or matrix may be generated from latency measurements to determine local timing offsets and media groupings for each participant. Because each later participant's experience depends on the arrival time of earlier participants' media streams (or, sometimes, the arrival time of later participants' media streams as shown in FIG. 1D), the system may automatically select an optimal combination of timing adjustments and local timing offsets for each participant based on relative latencies. In some implementations, additional factors may be used to adjust or weight latencies (e.g. latencies may be used as an input to a delay score, along with other inputs, such as a participant's preferences or willingness to be a leader with inputs from few or no additional participants; the participant's acceptance of additional synthesized or generated media streams (including multiplying their own media stream); social relationships between participants, to preferentially allow participants to interact more closely with close friends; etc.). For example, as discussed above, the acceptable range for different participants may be different sizes (e.g. 30 milliseconds, 50 milliseconds, 100 milliseconds, or any other such value), and media streams may be weighted or skewed towards the beginning or end of the acceptable synchronization window according to user preferences (allowing the participant to "lead" or "follow" media streams of other participants to a greater or lesser extent), device capabilities (including the capability of the device to generate or playback additional streams, or process streams to enhance acceptability through spatialization, equalization, etc.).

The resulting delay or timeline offset may be calculated for each media stream, participant, or device, with the offset utilized by the corresponding device relative to a synchronized time (e.g., synchronized clock shared by all devices or a common time reference such as a network time clock or GPS clock). For example, each device may have a local timing offset defined by a synchronized network time (e.g. 12:00:00.000), along with an offset (e.g. +175 milliseconds for participant B; +720 milliseconds for participant C; +1500 milliseconds for participant D; etc.).

In another implementation, rather than weighting different latency measurements, a weight or priority value (which may be variously referred to as a score, precedence, or by any other such term) may be determined for each remote stream. The weight or priority value for a stream may be particular to a recipient participant. For example, a stream from participant A may have a medium weight or priority value for participant B but may have a high weight or priority value for participant C (who happens to be close friends with participant A). Accordingly, in many implementations, the weight or priority value for a stream may be specific to a combination of that stream with a particular participant and may be recorded in a source-destination matrix similar to the one shown in FIG. 1F. Weights or priority values may be calculated as a combination of various factors, including social network relationships, geographic proximity, cohort or type, instrumentation, role, or any other factor. Once weights or priority values are determined, latency measurements may be multiplied by the weights or priority values to identify which streams should be selected for playback or processed in various ways.

In some implementations, when interdependent settings are being determined, each network pathway between pairs of devices is assigned a value, which may be based on latency, proximity, processing capability, type, role, or any combination of these or other factors. The components of the value may be positive or negative and may be combined together to obtain an output weight or priority value for the source-destination combination to determine the relative value of individual streams and total collaboration "value".

Figures 1F, 1G:
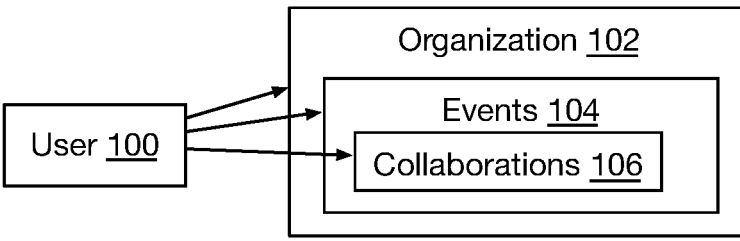
FIG. 1F is an illustration of an example latency matrix between client devices, according to some implementations.
FIG. 1G is a block diagram of a data structure, according to some implementations.

FIG. 1F is an illustration of an example latency matrix between client devices, according to some implementations, illustrating latency measurements between each source and destination. As shown, in many implementations, latency measurements may be different in different directions (e.g. 5 milliseconds from device A to device B, but 8 milliseconds from device B to device A, in the example shown). In other implementations, only half of the array may be used and bidirectional measurements may be averaged. In many implementations, communications may be direct between source and destination devices (e.g. using a peer-to-peer protocol such as the Web Real-Time Communications protocol (WebRTC)). In other implementations, communications may flow via an intermediary device, such as an intermediary server managing end to end communications between the client devices. Accordingly, latencies may be determined as end-to-end measurements (sometimes referred to as pathway latencies or values), and may be dependent on various intermediary devices and/or networks, processing or encoding/decoding delays, or other such factors. Latencies may be measured via request-response pairs, handshaking or synchronization algorithms, or any other suitable method.

In many implementations, latencies may be remeasured at the beginning of each collaboration session (of which multiple can occur during a communication session or event). For example, latencies may be measured before each song during a concert, before each movement of a symphony, before each verse of a spoken word poem, etc., and the latency value, stream distribution or selection, and local timing offsets and media timing offsets may be adjusted. In some implementations, latencies may be measured throughout the collaboration session (e.g. continuously or periodically) and timing offsets may be dynamically adjusted and/or applied at any opportune moment (e.g. during pauses, between songs or movements, etc.; or applied gradually by slowly increasing or decreasing the offset as needed until reaching a desired value). In other implementations, latencies, stream selections, participant settings, and/or other aspects of a collaboration session may be set at the beginning of an event or session and be utilized throughout.

One or more timing optimization methods may be utilized in different implementations. In particular, in many implementations, multiple timing optimization methods may be applied, as each may generate different results, take into account different characteristics or considerations, and/or have different accuracy or performance.

One timing optimization method that may be utilized is a basic iterative analysis, evaluating the matrix of pathway latencies between participants. The system may systematically try a range of different offsets for each participant and apply a single offset (for one participant) that will benefit the group experience the most. The system may consider the benefit to each participant, weighed against any negative impacts on other participants. Run in isolation, this method may change the offset for one participant, but is capable of producing precise unidirectional synchronization between participants. When run iteratively for each participant, the method may have good results.

A similar optimization method that may be utilized alone or in combination with the above is a complex iterative method that optimizes a specific group of participants before optimizing others. For example, a subset of participants may be selected based on their social network connections (e.g. close friends), based on their vocal characteristics (e.g. one from each voice part of soprano, alto, tenor, and bass), based on geographic proximity (e.g. users within a specified distance of each other first), or other such considerations. The generated order and timing results may be significantly different than with the basic iterative method discussed above.

Another method that may be utilized alone or in combination with the above is a pure stochastic method. States with randomized timeline offset values may be created and transmission delays simulated to determine which media streams arrive within the acceptable temporal window for each participant. While one iteration may be highly inaccurate and unoptimized, the method may be very fast and efficient for processing and, after many iterations, may result in very good performance.

Another method that may be utilized alone or in combination with the above is a guided stochastic method. Similar to the pure stochastic method discussed above, the guided stochastic method's random values focus on those related to the original timing relationships between the participants, and may result in higher accuracy after several iterations than the pure stochastic method.

Another method that may be utilized alone or in combination with the above is a sort-and-shift process which may be referred to as a "squish" method. Participants may be sorted into an order, typically based on latency measurements, and then offsets may be iteratively applied to each based on a latency between the participant and an immediate prior participant (e.g. for every participant other than the earliest participant). The process needs only a single iteration for each participant and may be very fast to run, but may not result in the most optimized timing.

Another method that may be utilized alone or in combination with the above is a machine learning-based approach. An expert system may be trained on historical latency measurements (or simulated latency measurements) and/or other data or characteristics (e.g. relationships between entities, preferences, vocal types or roles, etc.) and offsets applied manually to balance performance and other priorities (e.g. vocal parts, social network connections, geographic proximities, or other types and form of input data or characteristics). Once trained, the system may be used to generate stream selections, offsets, and any other aspect of participant or collaboration settings for new event instances.

Although discussed above in terms of timing optimization, other parameters than timing may be adjusted or optimized in similar fashion. Specifically, the optimization methods can optimize any production setting that is impacted by or improved through the manipulation of time, including one or more of source selection/latency filtering; timeline offsets; delay buffers; prominence adjustments (e.g. attenuating and specializing late-streams); or adding streams (e.g. derived streams). In many implementations, these optimizations can be executed for one or more participants or devices independently. In many implementations, the optimizations may be run interdependently—adjustments to a timeline or stream production settings for one participant or device may have an impact on the timelines and stream production settings for another participant or device.

In many implementations, the selection and offsets generated via each method (or each iteration within a method) may be scored with an optimization score, and the highest scoring state may be selected and utilized. Scores may be generated in various ways, such as calculating the amount of total buffering needed (e.g. such that states with lots of buffering of earlier streams are scored lower), determining a total length of delay used to implement a local timing offset for each participant (e.g. each local timing offset beyond a given T0 synchronized time), generating a score based on user performance reports (e.g. manual scoring of how acceptably a given collaboration configuration performed), determining the total number of streams provided to other devices (e.g. as opposed to synthesizing or duplicating streams for participants because too few acceptable remote streams are available), or combinations of these or other methods. For example, in one implementation, a total amount of local buffering required for a client device (e.g. delaying streams received prior to a playback time or local offset time) may be divided by a number of received media streams that may be played back at the specified time (e.g. such that shorter buffering is preferred for few streams, while longer buffering may be acceptable with a large number of streams). Accordingly, the score for any particular offset state or set of offsets may be based on the number of received streams (and, in some implementations, the number of processed streams or amount of processing or filtering applied to processed streams within a processed synchronization window), the amount of buffering required by each client or the total buffering amongst all clients, whether higher priority streams are received by participants (e.g. socially linked, geographically proximate, etc.), or any combination of these or other such factors. Timing offsets may be determined locally by each device, by a server and provided to each device, or by a combination of these (e.g. some devices generating timing offsets locally while other devices are provided timing offsets by a server, for example, based on processing power at each devices such that the server may provide timings to devices with less processing power while devices with higher processing power may make their own calculations). Although referred to as a server, in some implementations, a device may provide timing offsets to another device (e.g. a device with more processing power or acting as a host for a session providing timings to a device with less processing power or acting as a guest or follower for the session).

Once timing offsets and stream selections are identified, each client device may receive a configuration or instructions to receive, buffer, and/or process each other participant stream. For example, in many implementations, a selective forwarding unit of a server may provide a set of addresses and timing offsets to each participant to retrieve and buffer streams from other client devices. In other implementations, streams may be distributed directly amongst or between peers or from one 'leader' or host client device to others.

As discussed above, one or more collaborations may occur during a communication session (e.g. for different songs, readings, or other such events). To maintain states and configurations, a server and/or client device may maintain a data structure identifying each collaboration and related participants and timings. For example, FIG. 1G is a block diagram of such a data structure, according to some implementations. The data structure may comprise a nested structure of one or more collaborations 106 (corresponding to a period of time during which users participate together)

for each event 104 (corresponding to a shared experience taking place at a specific time); and one or more events for each organization or communication group 102. Users 100 may be associated with one or more organizations, events, and collaborations. For example, a group of users 100 in a choir organization 102 may have a weekly event 104, during which multiple song collaborations 106 are rehearsed. Preferences or configurations may be associated with each collaboration, event, or organization, such as vocal parts, priorities, or other settings. For example, a user may be identified as a soloist for a collaboration 106 such that their generated media stream may be given a high priority and/or provided to each other participant (e.g. with timing offsets ensuring that the soloist's stream is received by each other participant).

Figure 1H:
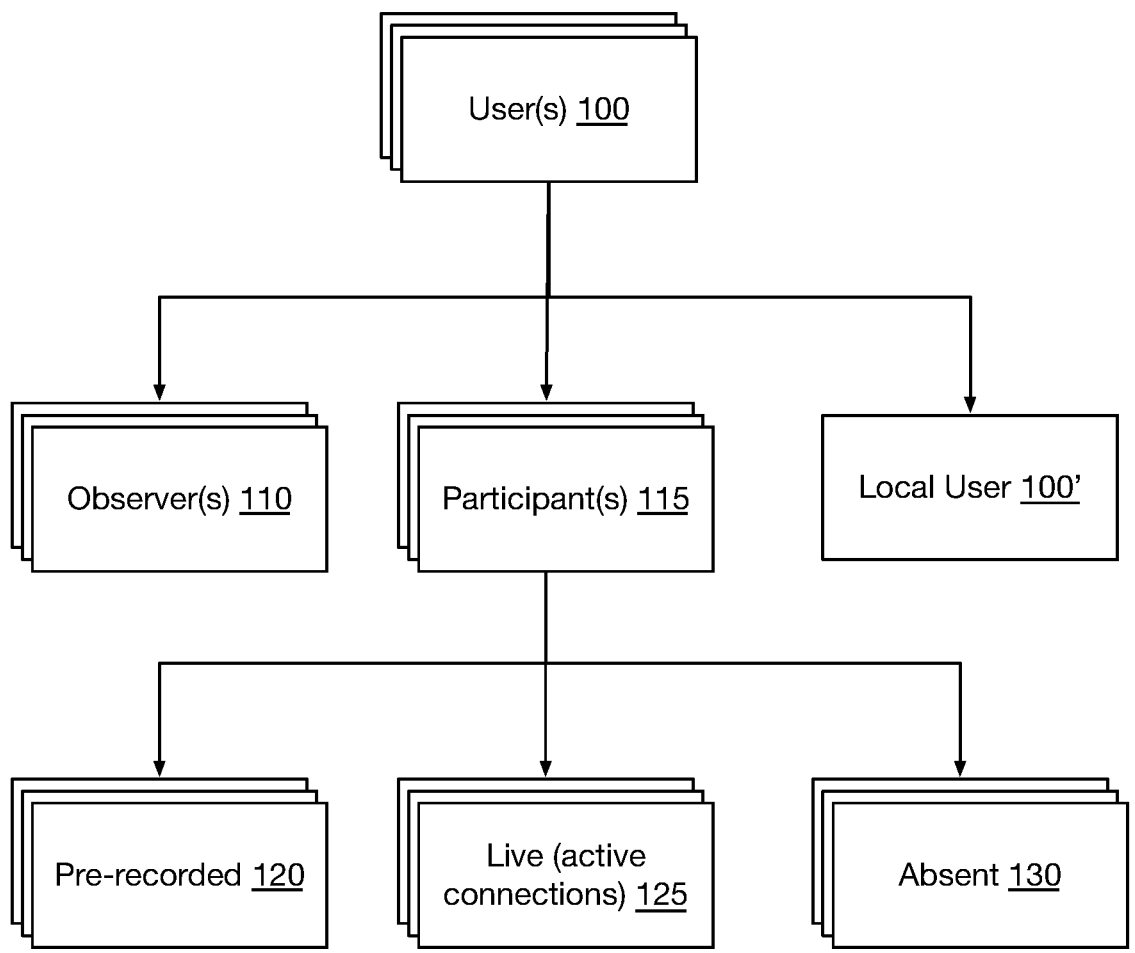
FIG. 1H is a block diagram of relationships between users, according to some implementations.

Not every user must participate to be included in the collaborative event, and non-participating users may be designated as observers. FIG. 1H is a block diagram of relationships between users 100, according to some implementations. The hierarchy of users and relationships may be maintained for each event 104 and/or collaboration 106. For example, users 100 may be sorted into non-participating observers 110 and participants 115 (and in some implementations, a local user 100' may be identified as part of the hierarchy, allowing for differentiating between remote offsets and local offsets). In many implementations, observers 110 may be deprioritized or excluded in the latency measurement array, or may receive a configuration with offsets corresponding to the longest measured latency, such that observers may receive a synchronized aggregation of all media streams. As shown, participants 115 may receive one or more pre-recorded media streams 120 and/or media streams from other participants 125.

Figure 2A:
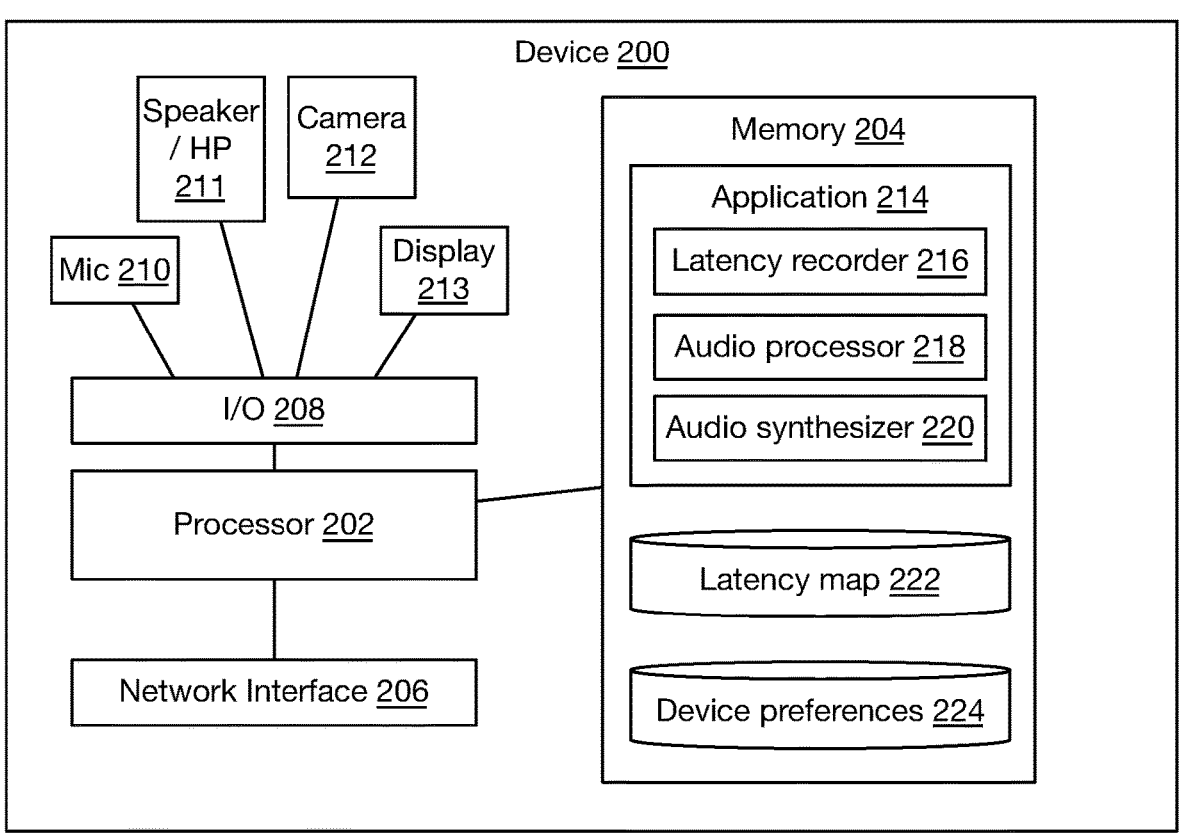
FIGS. 2A and 2B are block diagrams of a client device and a server device, respectively, according to some implementations.
Figure 2B:
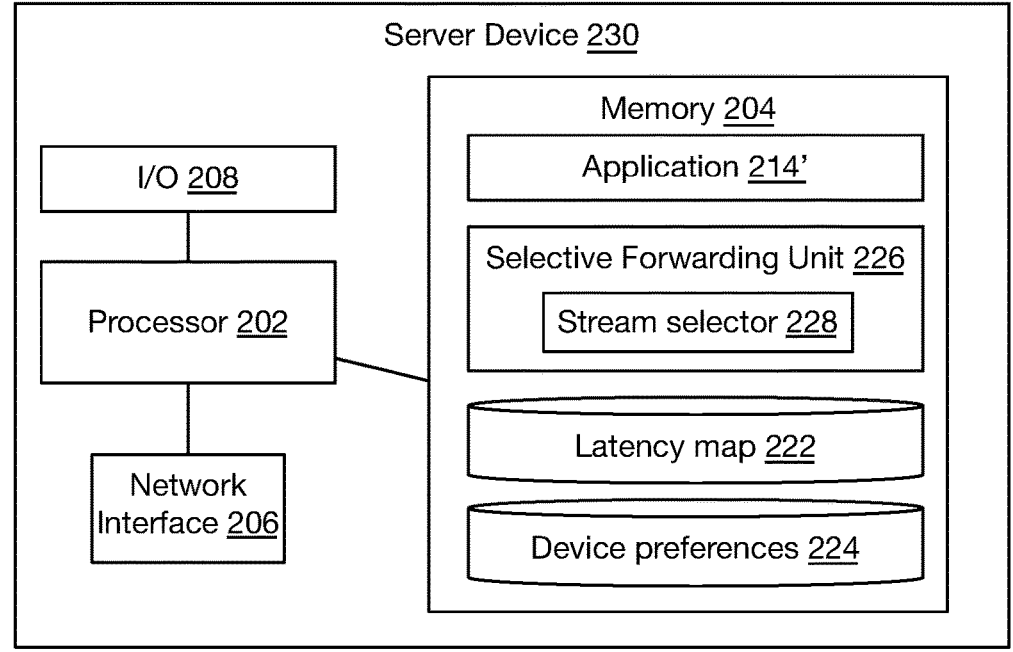

FIGS. 2A and 2B are block diagrams of a client device and a server device, respectively, according to some implementations. Referring first to FIG. 2A, illustrated is an implementation of a client or participant device 200, referred to variously as a client device, user device, participant device, or by other such terms, and may include a client 20 and/or remote client 26. A client device 200 may comprise a laptop computer, desktop computer, wearable computer, portable computer, smart phone, tablet computer, appliance, or any other type and form of device, and may be used by a user to generate and/or receive and play media streams. In some implementations, a client device 200 may not include all of elements 202-224 illustrated, or may include a plurality of any of elements 202-224 or other elements. For example, in one implementation, a client device 200 may comprise a plurality of network interfaces 206. Furthermore, although illustrated as a single device, in many implementations, a client device 200 may comprise a plurality of devices in communication via a network, such as an external camera 210 and a desktop computer with a processor 202.

A client device 200 may include one or more processors 202. A processor 202 may comprise a central processing unit (CPU), microprocessor, application-specific instruction-set (ASIC) processor, or any other type and form of processor for recording media input from a microphone 210 and/or camera 212, for outputting media generated locally or received remotely via a speaker or headphone 211 and/or display 213, and/or for communicating via a network interface 206 with other client devices 200 and/or a server device 230. A processor 202 may communicate with one or more network interfaces 206, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. In some implementations, processor 202 may comprise and/or communicate with other hardware processors, including audio processors, video processors, graphics processing units, tensor processing units, or any type and form of other processing circuitry. In other implementations, any or all of this functionality may be provided by the processor or processors 202.

Network interfaces 206 may communicate with client devices 200 and/or servers 230 via a network (not illustrated), which may comprise any type and form of network or networks, including a local area network (LAN) and/or wide area network (WAN) such as the Internet. For example, in many implementations, a client device 200 may connect to a first LAN, which may connect to the Internet, which may further connect to a second LAN connected to a server device 230. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices. A network interface 206 may include a network stack, which may comprise processing and functionality for a plurality of layers of the stack, including a physical layer, network layer, transport layer, session layer, presentation layer, application layer, or any other such layers. The network stack may comprise routines for encapsulating and de-encapsulating headers and payloads of packets at various layers, and may provide functionality for one or more protocols at any layer of the network stack including WebRTC, RTSP, HLS, or any other streaming protocol.

A client device 200 may execute a packet processing engine, which may be part of the network interface 206 or network stack, or may be executed separately by a processor 202. A packet processing engine may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, a packet processing engine may extract data or identifiers from a packet for analysis and filtering, such as extracting IP addresses or ports, protocol types, QoS parameters, payload sizes, sequence numbers, or any other type and form of information.

A client device 200 may comprise one or more input/output interfaces 208. An input or output interface 208 may comprise or communicate with any type and form of interface and/or connected peripherals, such as one or more microphones 210, speakers or headphones 211, cameras 212, displays 213, and/or other devices including amplifiers, mixers, processors, or other devices; a parallel or serial interface, such as a universal serial bus (USB) interface and a mouse or keyboard, or an external serial AT attachment (eSATA) interface and one or more external storage devices; or any other type and form of interface.

A client device 200 may comprise one or more memory devices 204. Memory 204 may comprise any type and form of memory or storage, including random access memory (RAM), hard drive storage, solid state drive storage, flash memory, optical or magneto-optical storage, tape storage, or any other type and form of storage device.

In some implementations, a client device 200 may execute an application 214. Application 214 may comprise an applet, server, daemon, service, routine, or other executable logic for capturing media including audio and/or video; streaming the media to one or more remote devices; receiving, processing, and rendering remote media streams; and/or generating or synthesizing media streams. In some implementations, application 214 may comprise a web browser application or social media application.

In some implementations, application 214 may comprise a latency recorder 216. Latency recorder 216 may comprise an application, service, server, daemon, routine, or other executable logic for measuring a latency or roundtrip latency to a server 230 and/or other devices 200. For example, in some implementations, latency recorder 216 may establish a communication session with a server device 230 and measure a round trip time of a request and response to the server, and may provide the measured latency to the server. The server may aggregate the measured latency with measurements by other client devices to determine a round trip time via the server. In other implementations, the server device 230 may provide addresses of other client devices 200, and latency recorder 216 may transmit requests (e.g. pings) and receive responses from each other client device directly, allowing for peer-to-peer latency measurements. In still other implementations, a server device or client device need not actually measure a latency between itself and another device, but may instead copy latency measurements received from other devices or copy measurements between the device and other devices. In some implementations, the latency value may be computed based on existing knowledge such as prior measurements or knowledge of network types and distances between devices or other such information, or copied from other systems or components. For example, a delay introduced by a buffer may be computed from the buffer size and clock rate; such calculated delays may be used in place of or in addition to measured delays (e.g. measuring a round trip or one-way communications time for communications not using an audio stream buffer, and augmenting the measurement with a calculated buffer delay to generate a total stream delay). Thus, in some implementations, the latency recorder may also measure and/or derive or calculate latency values of other types, including non-network latency values (e.g. audio and video processing delays, input and output buffer sizes from other devices, etc.).

Latency measurements may be stored in a latency map or matrix 222 by the latency recorder 216, and/or a latency map or matrix 222 may be received by application 214 from the server device 230, depending on implementation. In some implementations, latency measurements between the device 200 and other remote devices 200 may be provided to the server (e.g. as a one-dimensional vector or array) for generation of a latency map or matrix 222 (e.g. as a two-dimensional array combining each one-dimensional vector received from the client devices 200). The vectors and/or map may be ordered by device identifier in some implementations (e.g. {(latency to participant A), (latency to participant B), (latency to participant C), etc.}), or may comprise tuples of {device identifier, latency measurement} and may be reordered as needed by the server or the client device or devices. In some implementations, latency map or matrix 222 may be part of an application 214.

In some implementations, application 214 may comprise or communicate with an audio processor 218. Audio processor 218 may comprise software, hardware, or a combination of hardware and software. Audio processor 218 may comprise an application, applet, server, daemon, routine, or other executable logic for processing audio for spatialization, filtering, compression, attenuation, and/or for performing pitch, time, or formant shifting. Audio processor 218 may comprise a harmonizer, delay, modulator, or other functionality for multiplying a local audio stream to be perceived as one or more additional streams. In some implementations, audio processor 218 may provide spatialization within a three dimensional environment including panning, attenuation, filtering, and/or reverb to place later-received media streams at correspondingly further positions within the audio environment. In some implementations, audio processor 218 may also perform lossy or lossless data compression, including MPEG encoding or decoding or other perceptual audio encoding to reduce bandwidth requirements (e.g. VP8, VP9, Opus, etc.).

In some implementations, application 214 may comprise an audio synthesizer 220. Audio synthesizer may comprise a MIDI instrument or other software controlled instrumentation for generating additional media streams. In some implementations, audio synthesizer may play one or more parts of a predetermined musical score to fill in parts that are not received from remote devices (e.g. due to latency resulting in them being received outside of an acceptable synchronization window). Similarly, in some implementations, application 214 may play pre-recorded parts to fill in parts that are not received from remote devices.

In some implementations, application 214 may comprise or communicate with a video processor (not illustrated), which may include hardware, software, or a combination of hardware and software for generator and/or processing one or more video streams or images. In some implementations, the video processor may generate video from animations, images (e.g. profile pictures), avatars, or other entities or visual representations of corresponding audio streams. The video processor may, in some implementations, generate a virtual environment such as a two-dimensional or three-dimensional virtual environment, and may render received and/or locally generated or synthesized video or images within the virtual environment (e.g. a grid of video streams, avatars in a three-dimensional space, etc.). For example, in some implementations, the video processor may generate an avatar within a two or three dimensional environment to represent a remote client device or user with a late stream whose audio is being derived from the locally generated audio stream or that of another remote client device or user.

Memory 204 may store device preferences 224, which may comprise a set of preferences for acceptable latency ranges including tight synchronization and processed synchronization sub-ranges; prioritization preferences for soloists or leaders, social network connections to other users, vocal or instrument part identifiers, or other such preferences, which may be specific to a user of the device, or any groups they may be a member of. The device preferences 224 may be provided to a server 230 or other devices 200 and/or used for selection of streams and/or generation or synthesis of additional streams, or for configuring the types or nature of processing applied to remote or locally generated streams.

FIG. 2B is an illustration of a server device 230, according to some implementations. As shown, server device 230 may be similar to a client device 200, and comprise one or more processors 202, memory devices 204, network interfaces 206, and/or I/O devices 208. Server device 230 may comprise a physical computing device, or may comprise one or more virtual computing devices executed by one or more physical computing devices (e.g. a cloud server). The server device 230 may execute an application 214', similar to application 214.

In some implementations, server device 230 may execute a selective forwarding unit 226. Selective forwarding unit 226 may comprise an application, server, service, daemon, routine, or other executable logic for communicating signaling information to and from client devices 200, and receiving from and selectively forwarding media streams to client devices 200. In some implementations, selective forwarding unit 226 may comprise a webRTC server or similar protocol server for real time communications. Selective forwarding unit 226 may be configured to establish communication sessions with client devices 200 participating in collaborative teleconferencing. Establishing such sessions may comprise performing handshaking, authentication, synchronization, exchanging of encryption keys, or other such features, including in some implementations gathering device information or capabilities (e.g. connection bandwidth, video capabilities, etc.). In some implementations, selective forwarding unit 226 may comprise or be part of application 214'.

Selective forwarding unit 226 may comprise a stream selector 228, which may comprise an application, service, server, daemon, routine, or other executable logic for selecting audio and/or video streams to provide to other client devices, and for determining offsets via a latency map or matrix 222. In some implementations, latency map 222 may be part of the selective forwarding unit 226 and/or application 214'. In some implementations, server 230 may act in a spoke-and-hub configuration, receiving media streams from each client device 200 and forwarding the streams to one or more other client devices. In other implementations, client devices 200 may communicate in a peer-to-peer or mesh configuration, receiving media streams directly from other client devices without the streams traversing the server 230. For example, server 230 may direct a first client device 200A to retrieve a selected video and/or audio stream from a second client device 200B at a specified address, and/or may direct the second client device 200B to transmit the selected video and/or audio stream to the first client device 200A at another specified address. The client devices 200A-200B may then communicate directly to transmit and receive the video and/or audio stream until otherwise directed by server 230 via signaling communications, or termination of a session by a browser application 214. The selection of which client device streams to receive and what delay offsets to utilize may be under control of stream selector 228 in many implementations. Accordingly, stream selector 228 may perform one or more timing optimization methods as discussed above. In other implementations, selection and offset determinations may be made by the client devices 200. For example, in some implementations, audio stream selection may be performed by each client device, and each device may transmit a request to the selective forwarding unit for specific media streams; the selective forwarding unit may forward the requested streams to each recipient client device. This may reduce processing requirements and/or configuration requirements on the server, and allow for use of the system with legacy servers or servers that have not been customized with the systems and methods discussed herein to enable collaboration.

FIG. 2C is a block diagram illustrating media flow within a system for collaborative media, according to some implementations. As shown, media may be recorded locally from a microphone and, in some implementations, a camera. The media streams may be transmitted to other devices as output. In some implementations, an output of the microphone may also be provided to an audio processor and/or a voice multiplier for generation or synthesis of additional audio streams (e.g. to fill in for when there are too few participants). The generated streams may be combined with pre-recorded media streams or other types of streams, in some implementations. The pre-recorded media streams may also be output to a display, in some implementations (e.g. pre-recorded media streams from the same or other devices).

Incoming audio and/or video streams may be received and buffered according to collaboration timing adjustments and offsets, as determined according to a latency matrix as discussed above. The buffered video may be provided to a display and, in some implementations, mixed with pre-recorded video streams. The buffered audio may be processed for spatialization within a three dimensional space (e.g. panning, attenuation, filtering, reverb, etc.) and, in some implementations, may also be used to derive additional streams or multiplied to provide additional streams and expand the collaborative experience. The processed and buffered audio may be provided to an output and, in some implementations, mixed with locally generated or synthesized streams and/or pre-recorded media. Similarly, in some implementations, buffered video may be processed via a video processor (e.g. such as rendering video avatars in a three-dimensional environment, on a two-dimensional grid layout, or in any other format; transcoding video into different encoding system for different client devices or operating systems; rescaling video for different device display resolutions; or any other such processing). In other implementations, video streams may not be received, and the computing device may retrieve or generate alternate representations for each remote client device (e.g. avatars, animations, profile pictures, etc.).

FIG. 2D is a block diagram illustrating setup and processing flows within a system for collaborative media, according to some implementations. During collaboration setup, users or participants may join the event or collaboration; and may establish connections amongst and between participating computing devices (e.g. using WebRTC, RTSP, or other protocols that allow data and/or digital media transport between devices). Each device may measure and/or calculate latency to each other participating device, and may report the latency measurements with other devices and/or with a server (e.g. as ordered vectors, tuples, or any other suitable data structure). Each device may also retrieve or generate data representing user preferences, role (e.g. leader, soloist, etc.), vocal or instrument type, user-acceptable latencies or processing types, preferences regarding number of additional streams or types of streams, or any other such information, and may, in some implementations, provide the information to other devices or a server. The server and/or each device may identify one or more of the remote media streams to receive for each device and a device-specific local timing offset that will allow the device to receive and decode the selected remote streams for combination with a local stream. The remote media streams may be selected via one or more scoring algorithms as discussed above, such as the pure stochastic or guided stochastic methods, the simple or complex iterative methods, the "squish" method, and/or machine learning analysis, or any other such algorithm. The server and/or each device may also determine audio processing parameters for each stream and/or for locally generated streams (e.g. spatialization, filtering, attenuation, prominence of each stream in the final mix, etc.).

During collaboration processing, local media, selected remote media, and/or prerecorded media may be combined (with the latter two subject to stream offsets via local buffering to allow sufficient time for receipt and decoding). The local media, remote media, and/or prerecorded media may be used to derive additional streams (e.g. duplicated with pitch, timing, tone, or format shifts) and otherwise processed for output including attenuation, balancing, panning and 3D spatialization, reverb, filtering, or other processing before being output.

Figure 2E:
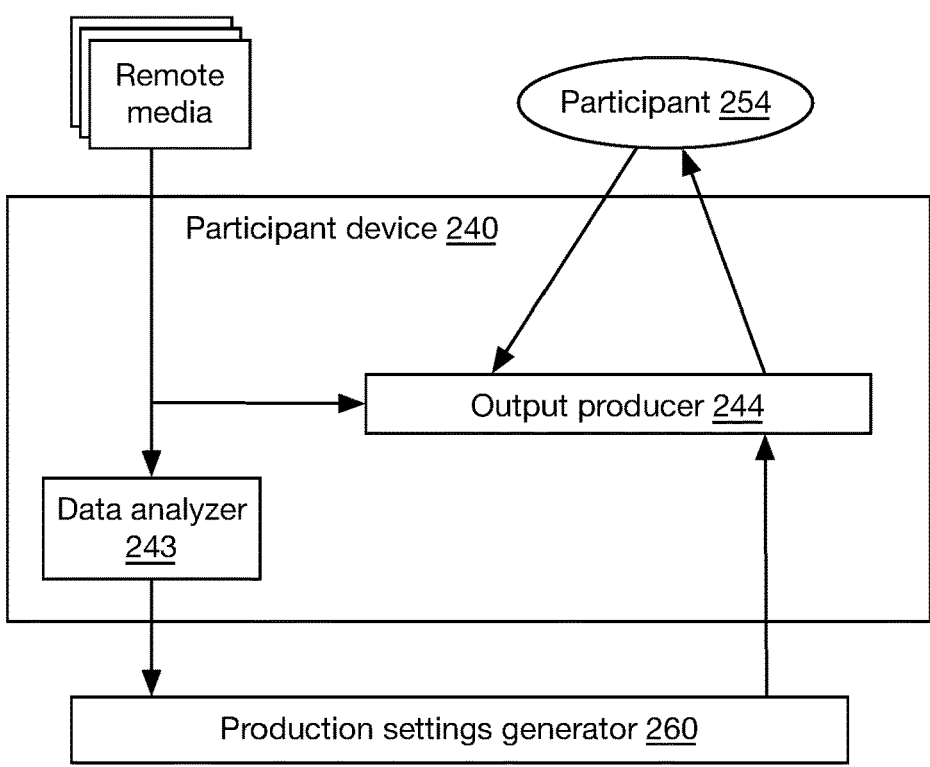
FIGS. 2E and 2F are block diagrams illustrating distribution of functions in a computing environment for collaborative media, according to some implementations.
Figure 2F:
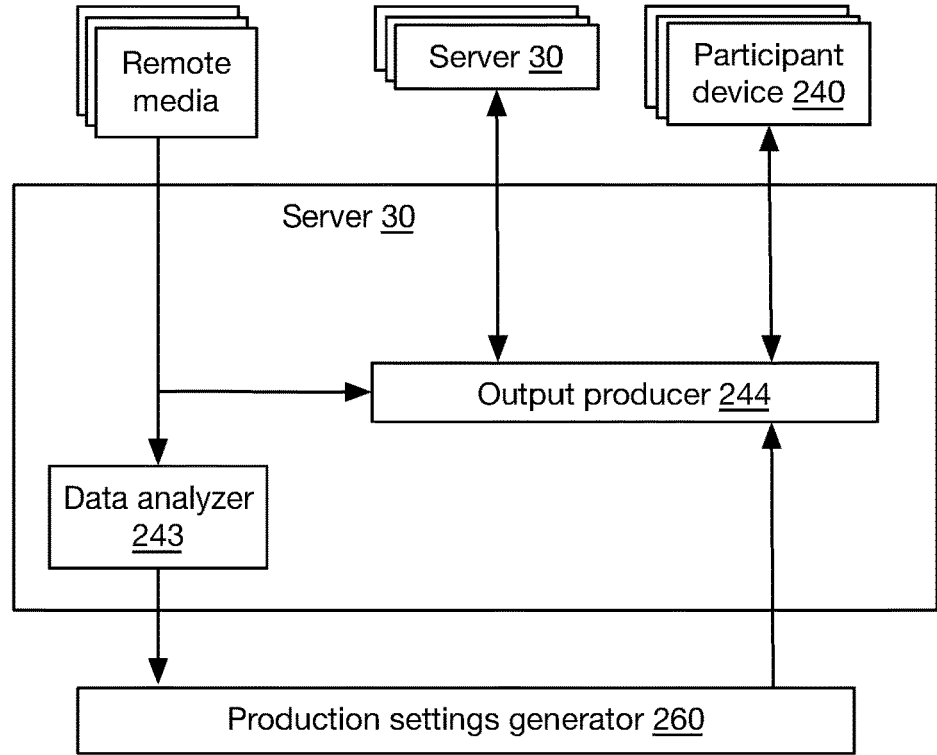

FIGS. 2E and 2F are block diagrams illustrating distribution of functions in a computing environment for collaborative media, according to some implementations. Referring first to FIG. 2E, participant device(s) 240 may receive media streams both from a local participant 254 (e.g. via a microphone, camera, instrument input, etc.) as well as from remote participant devices and/or stored media. A data analyzer 243, which may comprise hardware and/or software, may analyze incoming streams for timing and latency, content, type, processing, spatialization, or any other such data or metadata. The measured and retrieved data and metadata may be used by a production settings generator 260 to generate uniquely optimized and, in some implementations, interdependent production settings for the participants. Production settings generator 260 may comprise hardware and/or software for selecting streams and/or for setting parameters for deriving and/or synthesizing streams, and/or processing streams (e.g., equalizing, filtering, adding spatialization features, etc.). As shown, the production settings generator 260 may be separate from a participant device 240. In other implementations, the production settings generator 260 may be part of a participant device (e.g. software executed by a processor of a participant device 240). Output streams may be mixed together and/or processed and output via an output producer 244 in accordance with parameters from production settings generator 260. For example, production settings generator 260 may identify a subset of incoming streams to be played back with corresponding stream timing offsets applied to them, along with parameters for processing and/or generating each stream. In accordance with the settings or configuration from production settings generator 260, the output producer 244 may select and process the streams accordingly.

Referring briefly to FIG. 2F, data analysis, output production, and, in some implementations, production settings generation, may be performed by a server device 30 with the results provided to individual participant devices 240 and/or other servers.

Collaboration production settings may fall into two categories in many implementations, referred to here as independent and interdependent production settings. Interdependent production settings may refer to settings or configuration parameters that require coordination between participant devices. For example, local timing offsets may be considered interdependent production settings, as an offset applied on an earlier device may require a further offset on a later device (e.g., if participant B is delayed by one second to properly receive participant A's stream, participant C may be required to be delayed by two seconds to properly receive B's delayed stream). Other interdependent production settings may include spatialization and other effects that may affect participants' sense of proximity to one another or allow some pairs or subsets of participants to collaborate more effectively amongst themselves.

Device-independent production settings may be set regardless of other participants' settings in many implementations. Unlike the interdependent settings, in some implementations, these device-independent settings may end up having no direct impact on the experience of the other participants. Such settings may include relative audio level adjustments that would apply only to one participant's experience because of that participant's unique mix of interdependent production settings.

The generation of collaboration production settings may occur on one or more computing devices within the system. This processing may be done on any combination of servers and participant devices. Similarly, optimization of interdependent production settings may occur anywhere in the system. Each participant device may need to generate or receive a unique or device-corresponding set of the production settings. Device-independent production setting optimization may also occur anywhere in the system, though in many implementations, may be performed on each participant device individually.

Accordingly, in many implementations, data about the participants 254, their interconnections, the content of their media streams, details representing the goal of the collaboration, and any other data with the potential to impact optimization processes or the final collaborative experience may be analyzed and processed. The results may be used to generate detailed parameter settings for each participant's device for the purpose of producing a unique media experience that is both coordinated with the other participants and optimized for that individual participant's experience of the collaborative activity. Each participant's device may use the detailed parameter settings to present on the device a media production incorporating the detailed parameter settings and making use of available (remote or local) media streams and/or stored media. Delay buffers and processing may be applied to media streams and/or stored media to coordinate their presentation and deliver a more synchronous experience to the participant.

In some cases, media streams may be selectively excluded from being presented on some participant's devices to ensure the participant's experience is substantially synchronous. When media streams are excluded, or possibly in other circumstances, additional media streams from other sources may be presented to the participant. Sources may include remote media from live remote streams, remote media derived from live remote streams, prerecorded media, live media generated by the local participant, live or prerecorded media generated synthetically, and/or media generated by combining any of the aforementioned sources in various ways, as well as settings used to manipulate or control various other types of devices. Additionally, any of the media streams presented to a local participant may be processed in various ways. Examples of audio processing parameters may include timing/delay, gain/level, tone, pitch, vocal formant, and apparent spatial position relative to the participant. Similarly, video processing may be applied to video streams, including scaling, white balancing, transcoding, color processing, or any other type of processing. The coordinated parameter settings may also control haptics, electrical impulses, robotics, relays, motors, chemical reactions, lighting, pyrotechnics, fireworks, lasers, valves, and/or other devices and processes that may be controlled.

In some embodiments, participant devices may initially set a local clock or timer to a synchronized time or a common time reference, such as a network time source and/or GPS source, that allows all participating devices to agree on what time it is. In certain embodiments, all participant devices may collect and/or measure data pertaining to each of the incoming media streams. Such data may include:

media stream latency amount, or the time it takes to present the remote media stream to the local user, sometimes referred to as the playout delay. This may be a single measurement, or more usefully multiple measurements taken over time. To take such measurements, timestamps attached to the media stream may be compared to the synchronized time; and participant data, or various values representing information about the user, including how frequently they participate, data describing various aspects of their previous participation, whether or not they've expressed an interest in leadership, data from a social media graph, or any other such data.

In certain embodiments, a latency matrix between all participants and/or devices may be generated, representing latencies or delays between each media source and potential media destination. The latency of all of the participants' inbound media streams, along with other available data, may be used to determine coordinated delay buffer size settings and other types processing that may be applied differently to each media stream on each device to allow them to collaborate more effectively.

As discussed above, earlier media streams may be buffered and started in synchronization with later streams on each client device or at any other time deemed appropriate for the collaboration. Media streams that cannot be played with an acceptable level of synchronization may be reduced in prominence, and in some cases reduced to the point of exclusion. In this way, in certain embodiments, remote media with high latency may be excluded from presentation on a local device. To ameliorate the effect of excluded streams on a participant's experience, additional media may be generated (e.g., synthesized, played back from recordings, and/or dynamically generated from other available media or based on locally input media). Effects processing may be applied to the additional media to disambiguate them from the original source. These processes may work together to provide users with a collaborative experience in substantial synchronization.

Different participant computing devices may be utilized, including mobile phones, tablet computing devices, desktop computing devices, laptop computing devices, dedicated hardware devices or computing appliances, severs, or any other type and form of device. In certain embodiments, prerecorded reference media may be played on the local device. Any kind of media can be played as a reference. The reference media may play in substantial synchronization with each participant's perception of the collaboration. Examples of prerecorded reference media content include music backing tracks or accompaniments, videos or slide shows presenting lyrics, videos of music being performed, audio or video of a person engaging others in a responsive reading, data streams used to control a device or its peripheral devices, visual cues that may prompt participants to collaborate synchronously, etc.

Different routing architecture options may be utilized for media connections, including a peer-to-Peer (P2P) Mesh, a server-based Selective Forwarding Unit (SFU), a server-based Multipoint Conferencing Unit, or others.

One or more timing optimization processes and/or methods may be used, as discussed above, including a "basic incremental" method that attempts to changes the local timing offset for a single participant that would provide the most benefit to the timing for all the participants in the collaboration; a "complex incremental" method that attempts to change the timing of multiple participants in a way that would provide the most benefit to the timing for all the participants in the collaboration; a "pure stochastic" method that applies random values to the timing of all of the participants (which may be re-run repeatedly or iteratively, and may be computationally inexpensive and efficient); a "complex stochastic" method that applies random values to the timing of all of the participants, but with additional constraints beyond the pure stochastic method (e.g. limitations on values for participants based on roles or social network connections, etc.); and/or a machine learning method that applies an artificial intelligence model to implement improvements to the collaboration timing. Such a model may be produced by training a system how to produce output that matches the desired improvements for the collaboration.

Transformation and/or evaluation methods based on machine learning may be used to optimize any aspect or dimension of a collaboration that may be described as being set in any other way, individually or in any combination.

Figure 2G:
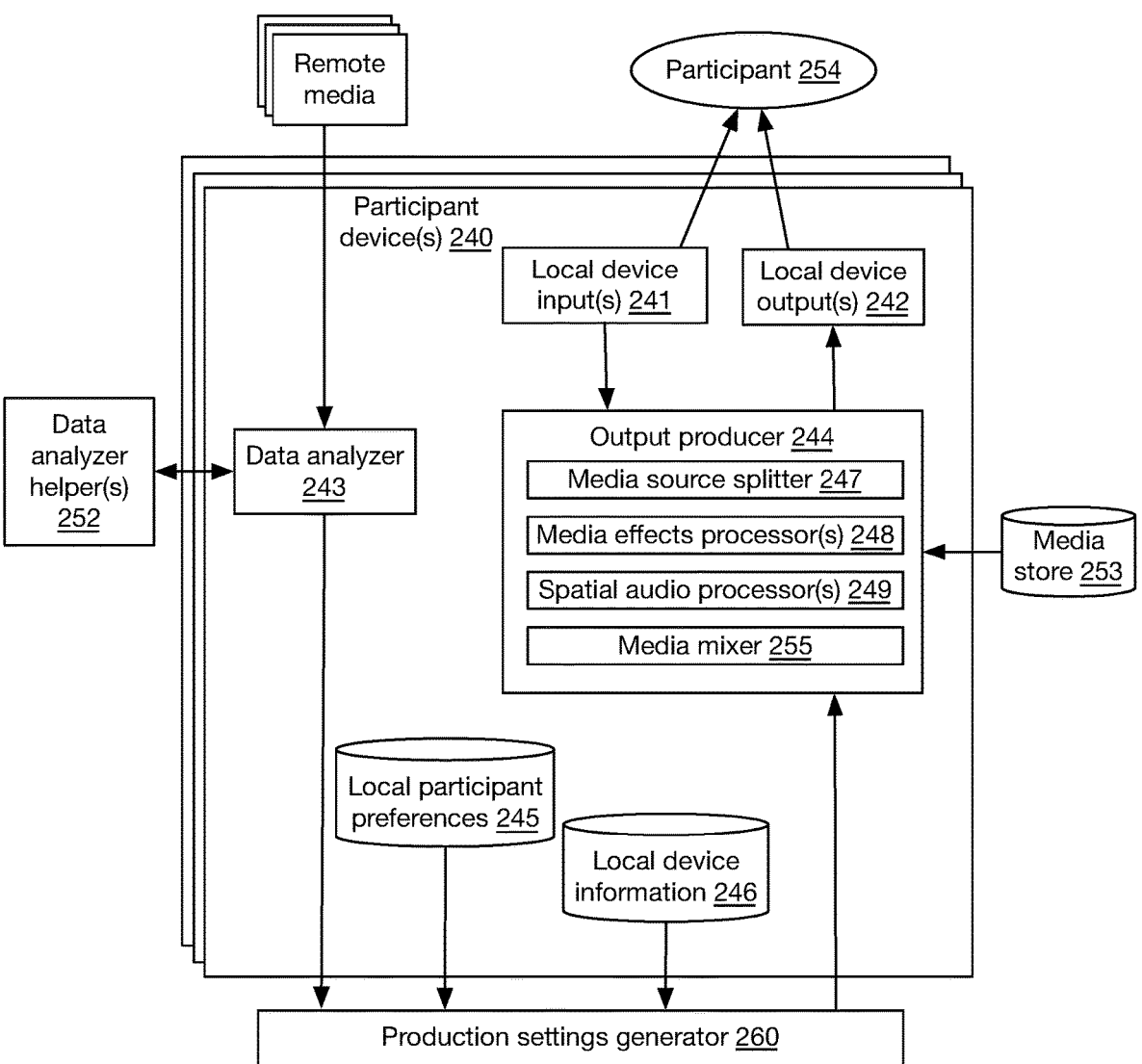
FIG. 2G is a block diagram illustrating another implementation of a client or participant device in a system for collaborative media.

FIG. 2G is a block diagram illustrating another implementation of a client or participant device in a system for collaborative media. A participant device 240, which may comprise a client device 20, may receive one or more remote media streams. Remote media may come from other participant devices 240, servers 30, or any other device, service, or resource with the ability to produce media. Remote media received by a participant device 240 may be analyzed by a data analyzer 243 which measures, retrieves, collects, or otherwise derives and/or evaluates technical data (including metadata) relating to the inbound remote media. Such technical data may include the stream's latency, bandwidth, resolution, source, codec, compression settings, or packet failure rate, among other possibilities. In addition to technical data, a data analyzer 243 may produce or derive data from the content of one or more of the remote media. Such content-derived data may include data about identified objects or people in the content, a singer's vocal pitch or tone, the level of noise or background sounds, facial expressions, the apparent age of the participants, the number of people present in a piece of media, or any other data that may be derived through media analysis. Data produced by the data analyzer 243 may produce data resulting from any type of analysis that may be performed on media stream content including results from the use of analytical techniques involving machine learning. The data analyzer 243 may do all of its analysis on the receiving device or may offload some or all of the analysis to one or more data analyzer helpers 252 running on other devices, servers, services, or any other resource setup to analyze media. The data produced by the data analyzer 243 is passed to a production settings generator 260, either on the participant device 240, on another device 240, on a server 30, or any other computing device.

In addition to the output from its data analyzer 243, participant devices 240 may send other data to the production settings generator 260, including local participant preferences 245 and/or local device information 246. Local participant preferences 245 may include any settings specified by the user of the participant device 240 or set by default. Such local participant preferences 245 may include a participant's request to suppress the presentation of media from their device (e.g. mute audio or turn off their camera) on the devices of one or more of the other participants; suppress, process, or otherwise modify the presentation of media from any source on their device; suppress the application of some number of processing types; be included in one or more cohorts; be positioned in virtual proximity to specified participants or cohorts; have their media presented to some or all other participants with some effects applied to their media; or any other preference that might be expressed by the user of a device; or by default. These cohorts could include family members, friends, participants with similar vocal qualities, participants that might typically sing the same vocal parts in a musical piece with multiple parts, or participants with any commonalities or any other reason to be grouped.

Local device information 246 may include unique device identifiers, device model, supported languages, locales, operating system version; information about a device's capabilities or capacity related to memory, networking, processing, performance, security; information about the current state of the device such as its location, connections to any networks or peripherals, the type and speed of those connections, remaining battery, processor load; information about subscriptions, use patterns, calendar items, contacts, or any other information available from the device that may be useful to a production settings generator 260.

Data from data analyzer 243, local participant preferences 245, and/or local device information 246 may be provided to a production settings generator 260; such data may be provided once, multiple times before or throughout a collaborative activity, continuously, or according to some other scheme for delivering data over time.

A collaboration output producer 244 processes, combines, otherwise manipulates, and mixes media and plays the resulting media production through the local device outputs 242 on a participant's device 240 for the participant, and/or passes the media production (or some portion thereof) to another participant device 240 or a server 30. The output producer 244 uses the production settings to determine how it will process, combine, and otherwise manipulate and mix all its available sources to produce output for the local device outputs 242 for the purpose of delivering an optimized collaboration experience for the participant 254. The output producer's 244 available sources may include local device input(s) 241, remote media, media from one or more media stores 253, or any other available source(s).

In some embodiments, a media store 253 may contain and/or provide stored media originating with other participants; prerecorded media to be used as a reference to sing, read, or cheer along to; media to be used to create atmosphere; media to be used in various types of effects processes (such as a convolution reverberator that produces an audio reverberation effect based on an audio source); and/or any other recorded media of any type that may be used as part of a media production. In some embodiments, a media store 253 may comprise a computing device and may generate media. The media store 253 may deliver media to an output producer 244 in advance or as needed; when delivered in advance, the media may be stored on the participant device 240 until needed. Media store 253 may be local to the participant device 240 and/or server 30, remote (e.g., network accessible), or a combination of local and remote storage.

In some embodiments, the output from a production settings generator 260 may provide the collaboration output producer 244 with specific data describing how to configure and set some or all of its components. In some embodiments, the output from a production settings generator 260 may provide the collaboration output producer 244 with only partial data describing how to configure and set its components in which case the output producer 244 may determine some or all of its configuration and settings based on inference, default settings, or some combination thereof. If output producer 244 determines some or all of its configuration and settings based on inference, it may do so using a production settings generator 260 on the local device or on any device within the system with available computing resources.

On each participant device 240, a collaboration output producer 244 may transform available sources using zero or more media source splitters 247, media effects processors 248, spatial audio processors 249, and media mixers 255, in any order or any combination, into a media production according to the collaboration production settings received from the production settings generator 260, to deliver an optimized collaborative experience for the participant 254. Some of the work of a collaboration output producer 244 may be done on other devices such as a server 30 or the devices of other participants 240, depending on network overhead or latency, processing capacity, memory capacity, or other network or device characteristics. Additionally, in some embodiments, there may be multiple production settings generators 260 with one closely coupled with the collaboration output producer 244 that may focus on independent settings for a single local participant's device.

In some embodiments, a media source splitter 247 allows a single source to be processed and output as if it were multiple sources or copies of the original source. This effectively provides additional media sources and that may be processed in different ways. Such media sources derived from an original source may undergo processing to disambiguate the derivative media from the original source. Derivative sources may also be processed to disambiguate them from one another, as well as the original source.

In many embodiments, a media effects processor 248 can be any processor capable of transforming media, such as analog or digital filters, mixers, pitch correctors, harmonizers, equalizers, delays, or other devices. Media effects processor 248 may be embodied in hardware, software, or both hardware and software, such as processing plugins executed by a media co-processor. Some embodiments may include multiple media effects processors 248. In some embodiments, media effects processors may be used to transform media for the purpose of making the media more suitable as a substitute for media that is unavailable, to aid in media disambiguation, for fun, or any other purpose that may serve the interests of one or more participants.

In many embodiments, a spatial audio processor 249 may distribute sound sources in a virtual multi-dimensional audio environment. In some embodiments, the virtual multi-dimensional audio environment experienced by the participants may be similar or different, realistic or unrealistic. In some embodiments, the audio sources may appear to be "placed" at a virtual position within the virtual multi-dimensional audio environment that is different from another audio source to help differentiate between a derivative audio source and the original source, or between a derivative audio source and one or more other derived audio sources.

The output producer may incorporate processors of any type that may provide a benefit to one or more participants. Such processors may operate on any form of media that may be used in a collaboration. Any of the aspects, timings, controls, effects, parameters, or dimensions of collaboration may be animated over time.

In many embodiments, a media mixer 255 may combine various media sources which may include media from a media store 253, local device inputs 241, and/or remote media. For the purpose of describing the mixer's function, media sources may include any of the aforementioned sources, any media split from or otherwise derived from those or other sources, and any such media processed by any media effects processors 248 and/or a spatial audio processor 249. The combined media sources are sent to the local device outputs 242. A participant may or may not have direct or indirect control over the media mixer, or any other functional elements of a collaboration output producer.

Figure 2H:
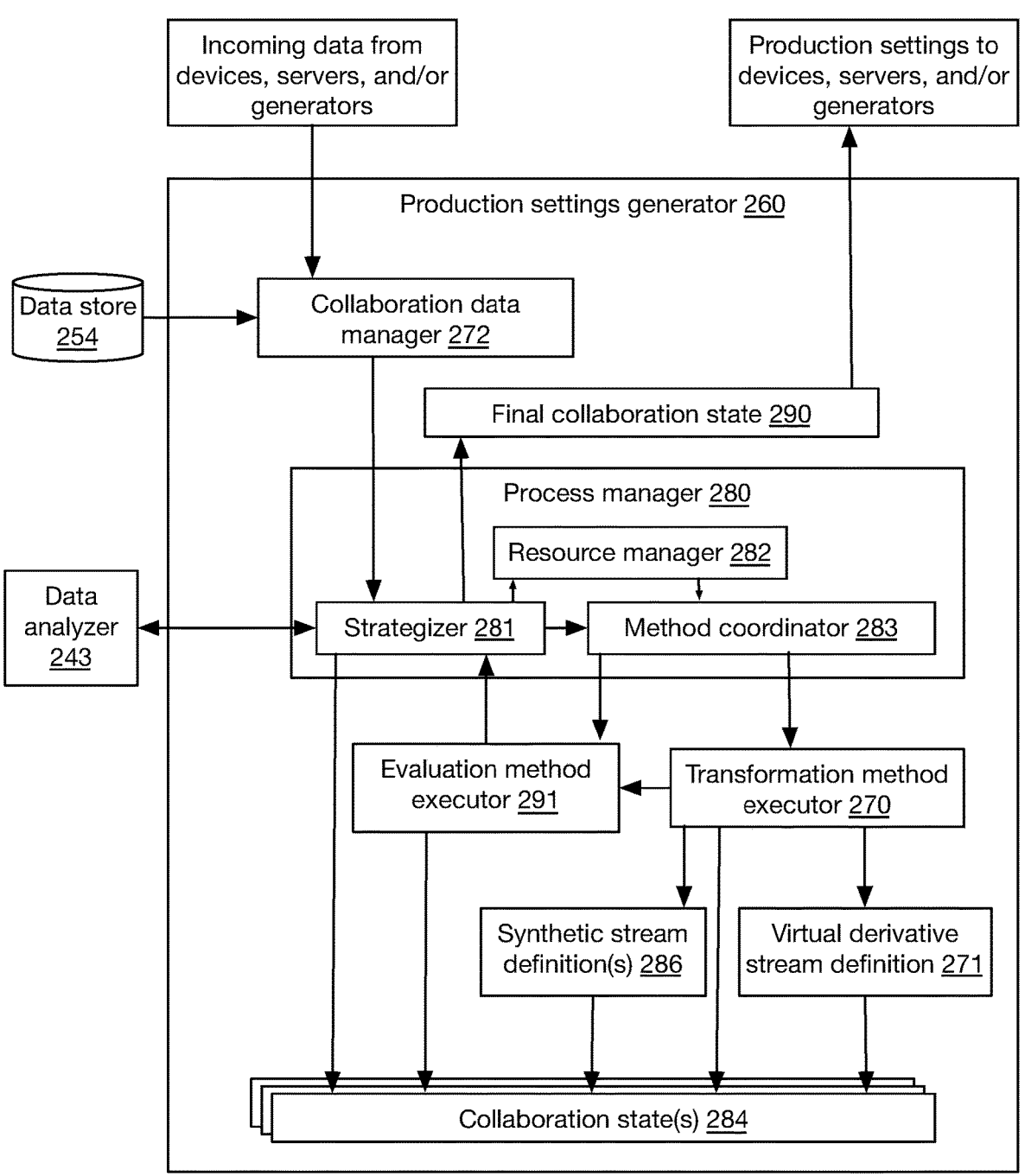
FIG. 2H is a block diagram illustrating a production settings generator for a system for collaborative media, according to some implementations.

FIG. 2H is a block diagram illustrating a production settings generator 260 for a system for collaborative media, according to some implementations. In some embodiments, one or more production settings generators 260 may exist on any number of clients, servers, services, devices, or any other resources in the system with computing capabilities. In some embodiments, a production settings generator 260 may consume data using a collaboration data manager 272. A collaboration data manager 272 compiles data output from the inbound data analyzer 243, the local participant preferences 245, and/or the local device information 246 of one or more participant devices. A collaboration data manager 272 may also incorporate data from a data store 254 that includes data and metadata about prerecorded participant media sources, prerecorded reference media sources, and a wide range of other types of data. In addition to being a central repository for data related to the collaboration, the collaboration data manager 272 may call on one or more data analyzers 243 to process, consolidate, transform, or otherwise change and/or combine data to make it more useful to and/or digestible for the strategizer 281. Data analysis may also occur within the process manager as a strategizer 281 and/or method coordinator 283. In many implementations, data analyzer 243 processes may be distinct from optimization and/or evaluation methods which act to transform and evaluate collaboration states 284. In such implementations, a data analyzer 243 may evaluate, transform, and/or summarize data used by the process manager as it produces an initial collaboration state, develops optimization strategies, and its processes. A data manager 272 collects (and optionally summarizes) data—typically, but not necessarily, from multiple sources.

A production settings generator 260 ultimately produces a final collaboration state 290 that, in comparison to some initial or default collaboration state 284, better satisfies the goals and interests of participants 254 engaging in the remote collaboration. In some embodiments, the final collaboration state 290 may be the same as an initial or default collaboration state 284. In some embodiments, a final collaboration state 290 may define the collaborative experience to be produced on one or more participant devices 240. Moreover, any destination may receive all or only some part of the final collaboration state 290.

Within the production settings generator 260, a process manager (PM) 280 may comprise an application, service, server, daemon, routine, or other executable logic for organizing and overseeing the work of optimizing the output production settings to create the desired result. The PM 280 may take in data continuously and/or provide continuous output. The functional elements of the PM 280 may determine the strategy and required processes—determining the selection, settings, and order of operations for executing various methods for transformation and evaluation; and, with a consideration of the available computing resources, managing when and which computing resources will be tasked with running the various methods for transformation and evaluation. The strategic work of the PM 280 is performed by a strategizer 281. A strategizer 281 may rely on a data analyzer 243 that may be closely coupled with it or be provided by an external device or service to analyze the data to make its determinations. A strategizer 281 may comprise an application, service, server, daemon, routine, or other executable logic for determining the selection, order, and/or frequency of other functions or modules being executed, may select from a wide range of transformation methods and evaluation methods, and may create complex criteria for determining the relative success of one or more transformation methods. PM 280 implementations may range from very simple to relatively complex:

In the simplest embodiments, a PM 280 may directly interpret the data provided to it to define the output of the production settings generator 260 with no transformation. For example, a leader may change a setting in the user interface on their device to specify a particular piece of reference media for a collaboration which may directly correlate to playing that piece of reference media in the production process on each device. In some embodiments, a PM 280 may call for the execution of a single preset transformation method—bypassing evaluation of any collaboration states. In some embodiments, PM 280 components may work cooperatively. Data is received by a strategizer 281 which continually refines the goals and strategies used to optimize the collaboration. A device resource manager 282 may evaluate the availability of computing resources for running transformation and evaluation processes. A method coordinator 283 controls which transformation and evaluation methods get run on which computing resources on which devices, and in what order. A transformation method executor 270 runs transformation methods on the "current" interim collaboration state 284 to produce a new interim collaboration state 284. The new collaboration state may then be evaluated using evaluation methods determined by a strategizer 281 that use criteria determined by a strategizer 281. Interim collaboration states 284 may comprise multiple dimensions such as timing, prominence, spatial position, among other things, and the composition of interim collaboration states may vary during the course of an optimization process. The PM 280 may coordinate the execution of successive transformations of different types to refine these states 284, with transformations to some types of states being influenced by interim collaboration states 284.

In some embodiments, a strategizer 281 may produce a final collaboration state 290 directly from the data it receives from the collaboration data manager, without optimization methods or interim collaboration states. For example, a participant may express an interest in being presented to other participants with a funny voice by setting a preference on their device; such a specific request may produce a final collaboration state 290 where, on each of the participant devices 240 engaging in the collaboration, a funny voice effect is applied to the audio media from the participant who set the preference. In this case, the final collaboration state 290 provides (to an output producer 244 on each participant device 240) the data needed to produce on each participant's device 240 a media experience where the participant asking to be presented with a funny voice will be presented with a funny voice. Each participant's device 240 may only need data or instructions or parameters to direct it to produce the stream from that participant with a funny voice effect applied to it. In this simple example, data received by the strategizer 281 from the collaboration data manager 272 is directly "mapped" onto the final collaboration state 290 sent to all the participant devices that may ultimately play the audio media from the participant setting the preference.

In some embodiments, a strategizer 281 may take data from the collaboration data manager 272 and determine that the goal of a collaboration would benefit from coordination of the participant's the local timing offsets, with prominence reduction for potentially disruptive media sources. In this more complex example, the goal of the collaboration cannot be achieved by simply "mapping" participant preferences onto a final collaboration state 290. Instead, the definition of the final collaboration state 290 will be determined by a process managed by a process manager 280, using one or more strategies determined by a strategizer 281. In this case, the strategizer's 281 work is not done when it produces a collaboration state. Instead, it will produce an initial collaboration state 284 based on available data and then may produce one or more transformed versions of that initial state until it determines (again, based on available data) which collaboration state 284 will be the final collaboration state 290.

According to some embodiments, a strategizer 281 may consume the output of the data manager 272 and produce one or more collaboration states 284 in the process of determining a final collaboration state 290. A collaboration state 284 may comprise a collection of data relating to one or more aspects of a collaborative experience (and may sometimes be referred to as initial or intermediate collaboration states). A final collaboration state 290 may comprise a special collaboration state 284 determined by a strategizer 281 to be appropriate output from the production settings generator 260. In some cases, the initial collaboration state produced by the strategizer 281 may be appropriate for output. In other cases, a strategizer 281 may produce an initial collaboration state and determine it may need to be transformed before becoming a final collaboration state 290. A collaboration state 284 may be modified "in place" such that each transformational modification replaces the original state 284, or one or more transformed collaboration states 284 may accumulate leaving a history of transformed states. In some embodiments, a maintained "history" of interim collaboration states may be of use to the strategizer, method coordinator, transformation methods, and/or evaluation methods.

In many embodiments, collaboration states 284 may be transformed across the dimensions of timing or prominence, among a range of other possibilities. Moreover, changing the local timing offset for one participant may affect how other participants experience a remote stream from that changed participant. And timing adjustments have the potential to affect to what degree a remote stream would be perceived as disruptive for some other participants. Furthermore, prominence may be expressed through making adjustments to a media source's audio gain, tone, and/or spatialization, and possibly other transformations, in any combination. Complex multidimensional interdependent transformations may be utilized to produce beneficial changes for the participants in the collaboration. This may be accomplished by defining a default collaboration state 284 which describes the experience of one or more participants (or the outputs of their devices) in the collaboration across one or more dimensions—strategically transforming a collaboration state 284 and then making a strategic determination as to when no more transformations will be done. Such a determination may be made by evaluating to what degree a transformed collaboration state 284 compares to a defined goal and/or one or more other collaboration states. The availability of resources needed to execute transformation methods or evaluation methods may also contribute to a strategizer's 281 determination that no additional transformations will be done.

Collaboration states 284 and final collaboration states 290 may represent an instance of a single- or multi-dimensional dataset where each dimension either maps directly to a corresponding production setting (e.g., a spatial audio position for each participant) or represents an aspect or dimension of participants' experience of a collaboration (e.g. the relative prominence of the other participants) that may be interpreted differently by different devices or functional elements within the system. For example, different devices or functional elements may ultimately adjust the relative prominence of media from participants differently by adjusting the size, gain, spatial position, or some other aspect of the media, in any combination based on other factors such as the availability of computing resource or user preferences.

Collaboration states 284 and final collaboration states 290 may include independent and/or interdependent settings, or some combination thereof. Interdependent settings are typically coordinated among participants to improve the experience one or more participants. In some embodiments, the most powerful aspects of the system are the coordinated interdependent settings that determine the size of the delay buffers (one of the effects processors 248 in FIG. 2G), which is the manifestation of the coordinated timing offsets determined as part of a timing optimization. Some examples of optimization strategies are described in more detail below.

Timing optimization may comprise a process by which the local timing offsets (relative to a synchronized time) for participants are changed (through the implementation of delay buffers) to coordinate at what time each participant experiences media from other participants. This, in turn, may affect when participants may act as they try to coordinate their actions with the media sources presented to them.

Prominence and inclusion control may comprise a process by which the perceived prominence or inclusion of media is controlled. Exclusion may be thought of as an absolute reduction in prominence. The exclusion of media that cannot be played with a high enough degree of synchronization may be referred to as the application of a "latency filter" or a "filter for late media." This may be used to strategically reduce the prominence of (or exclude) media from the experience of some participants. Similarly, some media could be selectively excluded on request through a user preference. Such exclusion may provide a benefit if playing the media would somehow interfere with the experience of the participant receiving the media. One example of this is when remote media arrives at a participant's device so late that it would disrupt the participant's sense of synchronization with other participants. Positive examples may include increasing the prominence of media from participants that share an affinity group. Negative examples include the exclusion of disruptive or distasteful media.

Missing media amelioration may comprise a process by which a media stream excluded by one of the aforementioned media exclusion examples may be "replaced" with media from some other source. In the audio realm, this may be achieved by deriving a "new" source from an existing source (such as an audio stream received earlier than the one being replaced, media from the local device, prerecorded media, or some other source) and then processing the replacement source to sound more like the missing source by adjusting its tonal equalization, pitch range, vocal formant, or other settings. Missing media amelioration may be accomplished in other ways for other types of media.

Proximity optimization may comprise a process by which the perceived spatial proximity of other participants is controlled in a coordinated way. This may be used to strategically group some cohorts or distance others.

Time-prioritizing leaders may comprise a process which responds to having one participant identified as a leader that will provide a live reference for the other participants, while sacrificing the ability to consume streams from some or all of the other participants. In this role, the local timing offsets of other participants would be adjusted to accommodate at least one stream, such as a stream from the leader.

Cohort clustering may comprise a process where the organizer of the collaboration might select one or more groups of participants to sing different vocal parts. The optimization would determine the proper settings to allow groups to have the same reference, the same leader, optimized local timing offsets within the group, increased virtual spatial proximity, and/or anything else that would increase group members' perceptions of being closer together or acting as a subgroup, somewhat separate from, but possibly still coordinated with, the actions of the group as a whole. In some cases, cohorts or groups would be combined into the whole to varying degrees. This is one example of what might result from the identification of subgroups within a collaboration such as friends, families, people with the same first name, etc.

In some implementations, one or more participants may choose to opt out from participation in a collaboration. A subsequent iteration of the optimization may result in completely reorganized and modified settings for the remaining participants. This example is similar to new participants joining or new latency or preference information being available for subsequent optimization iterations.

Any of the aforementioned optimization processes may affect or be affected by other forms of optimization. For example, optimizing the prominence and inclusion of media may be affected by timing optimization—so much so that incremental (or complete) prominence and timing optimizations may run after one another according to a strategy. For example, the prominence of a stream with problematic timing may need to be reduced—possibly to the point of exclusion, in which case it may not be presented.

A wide variety of optimization processes may occur within the production settings generator 260 before a result is finally output. Although production settings generator 260 output and the final collaboration state 290 may contain both interdependent and independent settings, each type of setting may not necessarily be optimized in isolation. Instead, the result of optimizations that may adjust independent settings may impact the interdependent settings, and vice versa. For example, in one embodiment, a transformation method determines it would benefit the collaborative experience to apply vocal formant shifting to a particular inbound media stream for a participant, and the application of that audio effect on that stream would add latency to the playout of that stream; that added latency may need to be taken into account by a collaboration timing optimizer that coordinates timelines offsets (delay buffer settings) between participants.

A strategizer 281 may function by analyzing the output of a collaboration data manager 272 to define and refine the goal(s) for the collaboration, and then determine which processes, methods, and evaluation criteria should be used to achieve the goal(s). The strategizer's 281 goal determination may depend on the purpose and type of collaborative activity, the expressed (and/or inferred) experiential expectations the participants or a leader, or any other available data. The goals, once determined, may be expressed by the strategizer 281 in terms of idealized target values resulting from an evaluation of a collaboration state 284. The strategizer 281 may also develop a plan for achieving the goals, with an awareness of all available data and all of the resources available to optimize the state of the collaboration. This includes an awareness of which transformation methods and evaluation methods run in which order on which devices can best produce improvements to the collaboration state 284 at hand.

For example, for the purposes of a particular collaboration, an activity leader may want each participant to have the sonic experience of being in the center of a large room surrounded by the other participants. A transformation method may set the spatial position of the remote participant's voices in a virtual circle around each participant. This is a relatively simple optimization as it involves no interdependent settings. As such, no evaluation is required. It also requires very little computing power and can therefore be run on many available devices, including each local participant's device 240.

For another audio-only collaboration, participants may gather to sing together expecting to hear the voices of the other participants singing along with them in substantial synchronization. This type of collaboration additionally requires that, for each participant, the prominence of each inbound audio stream needs to be adjusted based on how well its timing aligns with the participant's local timing offset—streams that align poorly may be reduced in prominence or even excluded. This is an example of a more complex goal so a more complex optimization strategy may be required: first, a time alignment transformation method may be chosen to run iteratively to improve the time alignment of the inbound remote audio streams. Then, the relative prominence of each audio source (post timing optimization) may be adjusted based on the time alignment resulting from the time alignment optimization.

Additional orders of complexity may arise with a scenario similar to the one previously described, except where the system attempts to "replace" streams that cannot be effectively time aligned using the aforementioned strategy. One or more suitable replacements may be derived from one or more existing sources, typically by processing them in various ways to generate derivative streams or sources. Similarly, a transformation method may add one or more replacement streams or synthetic streams that may be generated for a collaboration state 284. An evaluation method running on an evaluation method executor 291 may identify excluded streams. Data identifying the excluded streams may be passed to the strategizer 281 which may determine which optimization and evaluation methods need to be run (and in what order) to find and setup suitable replacement(s) for the excluded media. This requires coordination between the transformation methods and the evaluation methods. And as some types of processing used to create some forms of replacement media may add significant latency, the strategizer may determine additional timing optimization is required, with the added consideration of the "replacement" media along with the original media sources.

In response to the identification of opportunities to produce derivative sources to replace excluded sources, the strategizer may call on a transformation method focused on disambiguating a derivative from its original source. Such a method may examine characteristics of the original source and enable effects and settings for those effects that would help differentiate it from the derivative. For an audio source, effects that adjust the tone, pitch, and spatial position, among other things, may be used to distinguish the derivative from the original. If the original source is a solo voice, a formant adjusted octave shift and formant shifts may be used to further disambiguate the derivative from the original. Other forms of media would be transformed similarly using effects applicable to that domain.

Some transformation methods that may be incorporated into an optimization strategy are described along with a description of a transformation method executor 270. Some evaluation methods that may be incorporated into an optimization strategy are described along with a description of a collaboration state evaluator 291.

Optimization methods may prescribe the transformation or setting for any controllable aspect of a production, to be put into action by collaboration output producers 244 on participant devices 240. In some embodiments, transformation methods may transform collaboration states 284 in ways that may only affect subsequent optimizations or evaluations.

In some embodiments, a production settings generator 260 may generate or maintain one or more collaboration states 284. As discussed above, a collaboration state 284 may comprise a dataset directly or indirectly related to one or more aspects of the production of a collaborative activity.

A collaboration state 284 may comprise one or more datasets that each may be independent or interdependent between participants, or some combination thereof. For example, one dataset may define spatial audio positions for each audio source for each participant, and another may define interdependent local timing offsets for each participant. Collaboration states may be very complex with many layers of datasets. A collaboration state 284, may include data that may be transformed, evaluated, referred to, and/or otherwise relied upon by transformation methods and evaluation methods. A transformation method may transform a single datum or an entire collaboration state comprised of many datasets. Similarly, an evaluation method may evaluate a single datum or an entire collaboration state comprised of many datasets. Although not shown in the diagram, collaboration state 284 data may be used by the strategizer 281 and other parts of the process manager 280 or other components of the production settings generator 260.

Each collaboration transformation method attempts to make some meaningful changes to one or more elements of a collaboration state 284. These changes may be as granular as changing a single value that may result in a change to a single setting for a single participant, or as broad as something that could affect the entire experience for all of the participants. The degree of granularity of a transformation method may depend on the nature of the transformation method and the degree to which partial results might be meaningful. Optimization methods based on machine learning are more likely to affect multiple values.

Some transformation methods may need to be run iteratively to achieve a meaningful improvement in the collaboration state. And some may try and fail to produce a meaningful improvement. Many transformation methods may need to be followed by evaluation. An evaluation may need to be run after each time a transformation method is run. The number of times any one transformation method is run may depend on the nature of the transformation method and the computational cost of running it. This is primarily determined by the strategizer 281 and the method coordinator 283 with input from the resource manager 282.

Each collaboration evaluation method attempts to make some meaningful improvement in a collaboration state 284. Some transformation methods may need to be run iteratively to achieve a meaningful improvement in the collaboration state. And some transformation methods may try and fail to produce a meaningful improvement. An evaluation may be executed after a transformation method is executed to determine the collaboration state 284 resulting from the transformation method being executed. The number of times any one transformation method is run may depend on the nature of the method, the computational cost of running the method, and/or the range, ability, and availability of computing resources.

Optimization methods executed by a transformation method executor 270 may affect changes to any parts of a collaboration state 284. Examples include adjusting the local timing offset for the one participant who may benefit the most with the least negative impact on the experience of the other participants; spatially separating audio sources presented to one or more participants; reducing the prominence of audio sources with high latency; and randomizing production settings targeted for optimization.

In some embodiments, evaluation methods executed by an evaluation method executor 291 may compare collaboration states 284. An evaluation method may compare two or more collaboration states 284, or an evaluation method may evaluate a collaboration state 284 according to some other metric or set of metrics. In one embodiment, an evaluation of a collaboration state 284 may involve valuing each network pathway between participants, and then aggregating and/or summarizing those values to produce an overall value for the collaboration state 284. A similar valuation may be done for another collaboration state 284 and then the aggregated and/or summarized values of two states may be compared, and a determination may be made as to which of the two collaboration states 284 is of greater value. Such a comparison may involve any number of collaboration states 284. A collaboration state 284 determined to have a greater value may be selected by a strategizer 281 as the basis for subsequent optimization and evaluation operations.

In some embodiments where evaluation methods are used, sources other than remote media may be considered to have relative values. Such other sources include recorded media and media derived from other sources.

The final collaboration state 290 may be distributed (in whole or in part) to one or more participant devices 240, servers 30, production settings generators 260, or some combination thereof. Different portions of the collaboration state 290 may be provided to different devices or destinations, e.g., based on data explicitly specifying the distribution, or derived or inferred from available data sources or the final collaboration state 290 itself. In some implementations, the same final collaboration state 290 (containing data about all the participants and their settings) may be broadcast to some or all participating devices. In other implementations, subsets of data from the final collaboration state 290 may be selectively sent to subsets of participants, or explicit unique data may be sent to each participant, or data may be distributed via a combination of the aforementioned data distribution strategies. The final collaboration state 290 distributed may include explicit and unique production settings for each participant in a collaboration, general guidance as to how to produce a collaboration locally on each device, or anything in between.

Figure 3A:
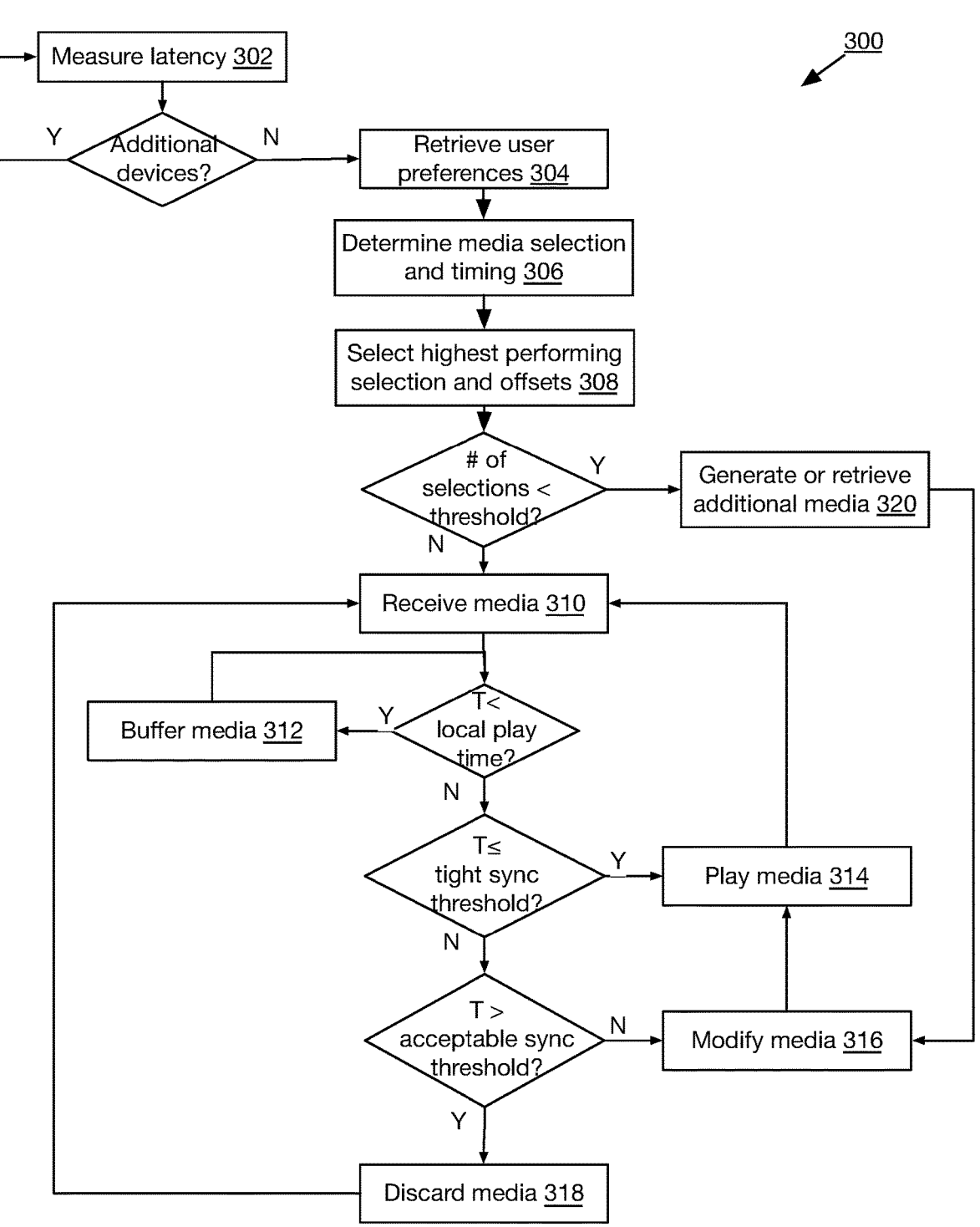
FIG. 3A is a flow chart of a method for dynamically synchronizing remote media streams, according to some implementations.

FIG. 3A is a flow chart of a method 300 for dynamically synchronizing remote media streams, according to some implementations. At step 302, a first device may establish connections to one or more additional devices (e.g. WebRTC protocol connections or any other suitable streaming or data transfer protocol), and may measure a latency or round trip time of communications with the additional device or devices, repeating step 302 for each additional device. Latency measurements may be stored in an array, vector, or other appropriate data structure. The array, vector, or other data structure may be shared with each other device and/or with a server, and the first device may receive corresponding other arrays, vectors, or data structures and may generate a latency matrix or map. In some implementations, the latency matrix may be generated or aggregated by a server and shared to each client device.

At step 304 in some implementations, user preferences, role, vocal or instrument type, social network connections, geographic location, or other information may be retrieved, such as preferences regarding a total number of streams, number or proportion of generated or synthesized streams, acceptable latency window or range including sub-ranges, acceptable processing preferences. In some implementations, the user preferences may be retrieved from a server managing the communications sessions, while in other implementations, the user preferences may be retrieved from local storage.

At step 306, the device and/or a server may determine a media stream selection and local timing offset for the device. In some implementations, the server may execute one or more stream selection algorithms, may select an optimal selection and timing, and may provide an identification of the selection and timing to each client device. In other implementations, each client device may execute the stream selection algorithm or algorithms locally, and may determine which remote streams to retrieve and their associated stream timing offsets (e.g. local timing offset, media timing offset), as well as whether and/or how to generate or synthesize streams locally or play back pre-recorded media. For example, as discussed above, in some implementations, the remote media streams may be selected via one or more scoring algorithms as discussed above, such as the pure stochastic or guided stochastic methods, the simple or complex iterative methods, the "squish" method, and/or machine learning analysis. In implementations using different selection and scoring algorithms, at step 308, a highest performing selection and offset set from the algorithm or algorithms producing the highest scoring results may be selected.

If the number of selections is greater than a threshold, then at step 310, the first device may receive or retrieve a media stream from a remote device. If a present time is prior to a local timing offset or media timing offset for the incoming stream (or such timing offset relative to a synchronized time), according to the offsets selected at step 308, then at step 312, the media stream may be buffered until the corresponding timing offset is reached. If the present time is greater than the media timing offset, then in some implementations, if the time is within a tight synchronization threshold (e.g. 30, 40, 50 milliseconds or any other suitable value), at step 314, the media stream may be played. If the present time is greater than the tight synchronization threshold but less than an acceptable synchronization threshold or range (e.g. 100, 150, 200, 250 milliseconds, or any other suitable value), then in some implementations at step 316, the media may be modified (e.g. filtered, attenuated, placed farther away within a 3D audio environment, etc.) and played at step 314. If the present time is outside of the acceptable synchronization threshold (e.g. the media stream arrives too late), then at step 318, the media stream may be discarded. In many implementations, steps 310-318 may be repeated in parallel for each of one or more additional media streams from other devices.

In some implementations, if a number of streams is below a threshold, then at step 320, the device may generate or retrieve one or more additional media streams, such as by duplicating a locally generated media stream, retrieving a pre-recorded media stream, or duplicating a remotely received media stream. At step 316, in some implementations, the additional media streams may be modified (e.g.

with pitch, time, formant, or tone shifts or other processing to present the additional media stream as distinct from an original locally generated or received media stream), and at step 314, the stream may be played.

Figure 3B:
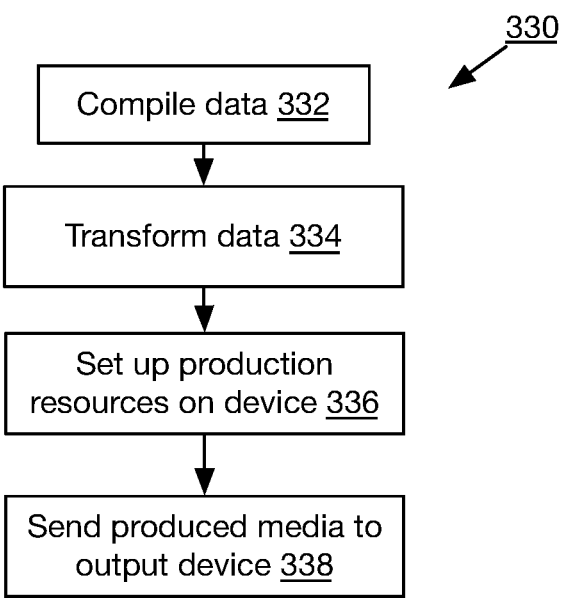

Other implementations of methods for determining timing offsets and optimizing playback and synchronization may be utilized. For example, FIGS. 3B-3C are flow charts of processes for optimizing media stream playback, according to some implementations. As discussed above, different implementations of optimization processes may be utilized, including processes that filter late media, apply strategic retiming, other types of processes, or meta-processes that combine any number of processes to produce complex multi-layer optimizations. These optimization processes may transform many different layers or dimensions of a collaboration. Optimization processes incorporate transformation methods and evaluation methods that may be referred to more generally as optimization methods. Transformations and evaluations generally refer to methods that transform or evaluate collaboration states. For simpler optimization processes that may be completed with a single run of one transformation method with no evaluation, the names and descriptions of the optimization processes and the transformation methods at the center of those process may sometimes be described and named interchangeably.

Filtering for late media may utilize various levels of complexity, such as hard filtering and soft filtering. Media filtering optimizations and methods may reduce or eliminate interference with a participant's positive collaboration experience by silencing, muting, or otherwise reducing the prominence of media with the potential to interfere with the participant's experience. This falls into the category of an independent optimization—one that may apply to the experience of an individual participant without necessarily impacting other participants.

However, in other examples, "independent" optimizations and/or methods may be used in combination with interdependent optimizations and/or methods to enhance their effectiveness.

Strategic retiming may improve the experience of time alignment for media played for one or more participants. While retiming media independently (on a single device) may produce a net benefit for the collaboration, especially if that device's output is not being played on any other devices, retiming will typically be an interdependent optimization where media timing is coordinated across some or all participant devices. In this type of interdependent optimization, improvements to the timing of some media may come at the expense of the time alignment of other media. To address the downside, this optimization may be followed by a late media filter to reduce or eliminate interference from the media streams that are not in substantial time-alignment with a participant's local timing offset. And beyond a strategic retiming optimization drawing on a wide range of data to value different media sources, this type of optimization may also draw on data from other collaboration state layers as exemplified in the complex multi-layer optimization example.

Complex multi-layer optimization may involve many cycles of collaboration state transformations and evaluations, more complex criteria for evaluations, dynamic introductions of derived and synthetic streams, controlled resource management, and distributed processing. The experience of a plurality of participants may be optimized along multiple dimensions—timing offsets, prominence (manifested in different ways), or the inclusion of synthesized media or media derived from existing media which may be capable of "replacing" media that might otherwise be "filtered out" for being distracting, among others.

FIG. 3B illustrates an implementation of an optimization which filters out or excludes late media 330. As discussed above, a hard filter for late media (HFLM) selects which media sources a participant device will produce based on the latency of the media sources. Late arriving media presented to a participant in a collaboration may interfere with a participant's experience of a collaborative activity. As this is not an interdependent optimization where the values for one device depends on how values may be set on another device, this optimization's processes may (but does not need to) all run on one device. This optimization may be accomplished with a single run of a transformation method that "maps" latency values to production settings values describing which media sources to produce on a participant device. In one example, a production settings generator is preset to produce a final collaboration state containing the results of an HFLM.

At step 332, data collected from a participant device (typically using a data analyzer) is presented to a data manager of a production settings generator. The data includes latency measurements associated with each directional pathway between pairs of participants. The data received by the data manager may include data related to media sources accessible to the local device because, in this case, the production settings generator is only responsible for producing a narrow range of non-interdependent production settings for a single device. For a non-interdependent transformation like this, everything from the data collection to output may occur on the same device. In some implementations, and in this example, the data from the data manager may serve as an initial collaboration state.

At step 334, a transformation method executor or processor of a device may execute the HFLM transformation. From an initial collaboration state, the transformation method executor or processor identifies the latency associated with each media source being presented to each participant (e.g., the pathway latencies). For each pathway, the transformation method executor or processor compares the latency amount to a threshold; if the latency amount of a pathway is below a predetermined threshold, the final collaboration state will identify the pathway (and/or the media source associated with the pathway) for inclusion in the media production presented to the receiving participant. The identification of pathways (or the media sources associated with them) for inclusion or exclusion may be represented using inclusion or exclusion lists, a collection of Boolean values associated with pathway or media source identifiers, or any other way of identifying a subset of media sources to include or exclude.

At step 336, the local participant device's output producer may set up the media sources specified in the final collaboration state based on the data in the final collaboration state. The output producer may also setup production resources to mix, balance, or otherwise process the media sources in other ways.

At step 338, the output producer may send a media production (incorporating one or more of the media streams selected to be presented) to the local device outputs of the participant device.

FIG. 3C illustrates a flow chart of a method for transforming and processing media. In a first example, a transformation method executor or processor may adjust the relative prominence of media sources based on latency. This can be accomplished with a single run of a transformation method that "maps" latency values to prominence values.

Prominence may be represented by a discreet on/off value or a continuous value expressing the relative prominence of each media source that may be presented to a participant. Although prominence is sufficient to conceptually describe how media sources might be presented relative to one another, it may not adequately define a specific value for a parameter of one or more production components. The determination of how a particular prominence value translates to one or more production component parameters may require additional interpretation and refinement. Such additional interpretation and refinement may be performed by one or more production settings generators that take the output of a late media filter optimization as input and produce a collaboration state with more specific values that may be used more directly to set one or more parameters of one or more production components.

At step 352, data may be presented to a data manager of a production settings generator. The presented data may comprise basic information about the specification of a "late media filter" (with no other optimizations) and latency measurements associated with each directional pathway between pairs of participants. In this instance, no other data is required. If the production settings generator is responsible for producing a narrow range of production settings for only a single local device—as might be the case in this situation where the settings being optimized are not inter-dependent—the data received by the production settings generator may only include data related to media sources accessible to the local device.

If the data presented to the data manger consists of only the specification of a late media filter and the required latency measurements, the data manager has no work to do other than to pass this data to the strategizer. In other cases, more complex data inputs may need to be summarized or otherwise pre-processed.

Based on the available data, the strategizer may determine goals or criteria for evaluating improvements at step 354. For example, in some implementations, the only goal is to implement a "late media filter" as specified by the leader.

At step 358, the strategizer may determine that to produce a final collaboration state with a late media filter applied to it, a production settings generator will require an initial collaboration state containing a list of pathways with default values representing the enablement or disablement of all pathways; a single run of a late media filter transformation method to transform the initial collaboration state into a final collaboration state; and no evaluation criteria.

At step 360, a resource manager may identify which computing resources are available and capable of running a late media filter transformation method on the initial collaboration state. If computing resources are available to run the transformation method, then at step 362, the method coordinator schedules the late media filter transformation method to run on an available and capable device. If resources are not available, the production of the collaboration may fail or wait until the required resources become available.

At step 364, the late media filter transformation method runs and a final collaboration state is produced with each source presented to each participant being assigned a prominence value based on the latency of each source. At step 366, the evaluation of the resulting final collaboration state may be bypassed because, in the example discussed above, the strategizer has determined there is no need to evaluate the results of a late media filter transformation method run in isolation.

At step 366, the strategizer determines a new collaboration state has been produced and, after determining no evaluation is necessary, it safely presumes the optimization is complete and ends the optimization at step 368.

At step 370, the state distributor sends the final collaboration state (containing the new prominence values for each presented source) to any device(s) that may use state data to produce the collaboration, or perform additional optimizations. In the case of an independent optimization, this may all happen on the same device. In some embodiments, a state distributor may send subsets of the final collaboration state to some devices, particularly if some parts of the state would not be useful for the receiving device. A state distributor may also distribute pathway timing data or any other data available to the production settings generator if it may be of use to the recipient of the state distributor's output.

At step 372, the device(s) receive a collaboration state (or subsets of the state) from a production settings generator and may perform additional optimizations (using another production settings generator, such as a local production settings generator) to further improve the final result for production on the local device, or to pass along to another device. Normalizing and/or balancing the gain of the various audio sources on a device is an example of an optimization that may be performed on the local device mixed media production to a participant.

At step 374, each device sets up the production using resources (the media, splitter, effects, mixer, etc.), routes, and processing based on the data in the final collaboration state. At step 376, the participant device(s) send their processed media to their local outputs devices.

As discussed above, different optimization methods may be utilized. Still referring to FIG. 3C, in some implementations, a strategic retiming transformation may be used to adjust the relative timing of media sources for the purpose of allowing participants engaging in a remote collaboration to experience a higher degree of synchronization. Run in isolation, a strategic retiming optimization may produce a collaboration state with a greater degree of synchronization for some media playing back to some participants; however, this may also result in some media playing back with less synchronization than if none of the media was retimed. To address this, as described earlier, a strategic retiming optimization may be followed by a filter for late media to reduce or eliminate interference from the media streams that are not in substantial time-alignment with a participant's local timing offset.

In such an example, at step 352, data is presented to a data manager of a production settings generator. The presented data includes latency measurements associated with each directional pathway between pairs of participants and may include other data. In this example, no other data is required; however, this type of optimization may also take advantage of many other types of data that could be used to guide decisions about which retiming methods may be run and in what order, collaboration state evaluation criteria, parameters for managing computing resources used for running optimization methods and other aspects of an optimization, and anything that may be used to help value pathways. In other implementations, much or all of the strategic decisions may be preset.

An example of source data used for strategic retiming includes pathway latency data (in milliseconds):

Participant A
        Lateness of media from Participant B
        Lateness of media from Participant C
        Lateness of media from Participant n Participant B
   Lateness of media from Participant A
   Lateness of media from Participant C
   Lateness of media from Participant n
Participant C
   Lateness of media from Participant A
   Lateness of media from Participant B
   Lateness of media from Participant n
Participant n
   Lateness of media from Participant A
   Lateness of media from Participant B
   Lateness of media from Participant C Based on the available data, at step 354, the strategizer determines the criteria used to evaluate the success of the optimization may be the aggregate "value" of media played for participants. A collaboration state where the sum of the media playback values received by all the participants is higher may be evaluated to be higher (better than a collaboration state where the sum of the media playback values received by all the participants is lowerworse. Media playback evaluation may be based on the media's playback timing accuracy; perfectly synchronized media may be assigned the maximum value, and any media that would play late enough that it would be disruptive may be assigned the minimum value. The scale of media playback values may be normalized to a range from 0.0 to 1.0 or any other range. Media playback values in between the maximum (perfectly synchronized) and minimum (unusably disruptive) may or may not be employed. Media playback values in between the minimum and maximum may represent a range between perfect synchronization and the threshold of acceptability for unsynchronized media playback; the range of in-between values may be scaled in various ways—on an exponential or logarithmic curve, or according to any method of scaling, mapping, or transformation. Such scaling may be thought of as expressing varying levels of sensitivity to timing inaccuracy for one or more participants.

Example of criteria used to evaluate a strategic retiming optimization include pathway values:
Participant A
   Relative value of media from Participant B
   Relative value of media from Participant C
   Relative value of media from Participant n
Participant B
   Relative value of media from Participant A
   Relative value of media from Participant C
   Relative value of media from Participant n
Participant C
   Relative value of media from Participant A
   Relative value of media from Participant B
   Relative value of media from Participant n
Participant n
   Relative value of media from Participant A
   Relative value of media from Participant B
   Relative value of media from Participant C
Perceived remote participant count:
Participant A
Participant B
Participant C
Participant n The value of a collaboration state after being transformed by a strategic retiming may be expressed using the following formula, in some implementations:
P=Participant
n=the total number of participants
$v(P_i, P_j)$=the value of a pathway between Participant i and Participant j $$\frac{\sum_{i=1}^{n}\sum_{j=1}^{n} v(P_i, P_j)}{P(n-1)}$$

Other metrics or calculations may be utilized in other implementations.

At step 356, an initial collaboration state may be created by a strategizer, and may contain a local timing offset for each participant. As discussed above, each participant's local timing offset may represent a time offset from the synchronized time. In the initial collaboration state, the local timing offset for each participant will normally be set to zero, representing that, by default, the timing of each participant's experience of the collaboration will be aligned with the synchronized time. In other embodiments, the initial collaboration state may use some other time representation(s); it may hold the playout time for each unprocessed media source that may be presented to each participant, the amount of additional delay buffer applied to each of one or more media sources available to be played to each participant, or some other representation of the timing for media or each participant's experience relative to the synchronized time or some other time reference available on each participant's local device.

At step 358, the strategizer determines that to produce a final collaboration state with a high value, it may try running a random retiming transformation followed by an evaluation of the resulting collaboration state. Many other methods or combinations of methods may be selected.

At step 360, a resource manager may identify a single leader device with available computing resources capable of running many optimization methods. The resource manager also determines there is enough time to run optimization methods using the available computing resources. If the time or computing resources were not available, the system might produce an error, a partially optimized collaboration state, or some other result. In some embodiments, optimization methods (or entire processes) may run in parallel on multiple devices or according to any other method of allocating computing resource across an individual device or across multiple devices.

At step 362, a method coordinator may schedule the random retiming transformation method to be run on a designated leader device.

At step 364, a random retiming transformation method may be executed on the designated leader device. Unlike some transformation methods, the random retiming method may not necessarily rely on an existing collaboration state to produce results. The random retiming transformation method produces a new collaboration state with random changes to the media playback time of one or more media elements on one or more participant devices. In some implementations, the random retiming may be guided by or constrained within predetermined ranges, based on previously produced collaboration states, or any other method of controlling or constraining random or pseudo-random values.

At step 366, an evaluation method may be run on the resulting collaboration state. The evaluation results are returned to the strategizer. If the goal criteria have been met, the strategizer determines the collaboration state with the highest value will be the final collaboration state and the optimization may end at step 368. If the goal criteria have not been met, the cycle may start over at step 358 with additional transformation methods and possibly more evaluation methods.

At step 370, once the optimization is done running its transformation and evaluation methods, a state distributor distributes the final collaboration state to participant devices, servers, and/or other production settings generators as discussed above. In some embodiments, a state distributor may distribute (to some or all receiving devices) only part of the final collaboration state. At step 372, each device receiving the final collaboration state may perform additional optimizations. At step 374, each participant device receiving a final collaboration state may use an output producer to collect the media and setup the resources needed to feed to the local device output(s) a mixed media production based on the data specified in the final collaboration state, and at step 376, the produced media is sent to the local output devices.

As discussed above, in some implementations, a complex multi-layer optimization may coordinate many dimensions of the collaborative experience—and by extension the media, production resources, configuration, and settings required to produce such an experience—across multiple participants. And the final output may incorporate synthesized media and/or media derived from existing media sources. Still referring to FIG. 3C, an embodiment of a complex multi-layer optimization that demonstrates the coordination of multiple dimensions of the collaborative experience and the incorporation of synthesized media and/or media derived from existing media will be described.

At step 352, data is presented to a data manager of a production settings generator. The presented data includes latency measurements associated with each directional pathway between pairs of participants, the identification of cohorts based on vocal range, the identification of "leaders" to feature, a definition of the virtual "environment" for the collaboration defining the size and sonic characteristics of the virtual space, prerecorded reference media (including metadata), and participant preference settings identifying each participant's desire to experience the collaboration in close proximity to selected other participants along with a preference to opt out of having media they generate presented to a selected other participants.

Example source data for one possible implementation of a complex multi-layer optimization includes:
    Environment:
        Virtual room dimension; and
        Acoustic reverberation characteristics (reflective hall, carpeted room, etc.).
    Prerecorded reference media:
        Sound recording of a backing audio track(s); and
        Timed slideshow with lyrics.
    Featured Leader(s):
        Participant A; and
        Participant C.
    Cohorts:
        Cohort 1:
            Participant A;
            Participant B; and
            Participant C.
        Cohort 2:
            Participant D;
            Participant E; and
            Participants n.
    Participant-specific data:
        Participant A:
            Vocal range: High
            Opt-out selections
                None
            Proximity requests:
                Prefers to be near participant B Latency pathways
                Lateness of media from Participant B
                Lateness of media from Participant C
                Lateness of media from Participant D
                Lateness of media from Participant E
                Lateness of media from Participant n
        Participant B:
            Vocal range: Undefined
            Opt-out selections
                Do not present Participant B media to Participant C
            Proximity requests:
                Prefers to be near participant A
            Latency pathways
                Lateness of media from Participant A
                Lateness of media from Participant C
                Lateness of media from Participant D
                Lateness of media from Participant E
                Lateness of media from Participant n
        Participant C:
            Vocal range: Low
            Opt-out selections
                None
            Proximity requests:
                Prefers to be near participant D
                Prefers to be near participant E
            Latency pathways
                Lateness of media from Participant A
                Lateness of media from Participant B
                Lateness of media from Participant D
                Lateness of media from Participant E
                Lateness of media from Participant n
        Participant D:
            Vocal range: High
            Opt-out selections
                Do not present Participant D media to Participant B
            Proximity requests:
                None
            Latency pathways
                Lateness of media from Participant A
                Lateness of media from Participant B
                Lateness of media from Participant C
                Lateness of media from Participant E
                Lateness of media from Participant n
        Participant E:
            Vocal range: High
            Opt-out selections
                Do not present Participant D media to Participant B
            Proximity requests:
                None
            Latency pathways
                Lateness of media from Participant A
                Lateness of media from Participant B
                Lateness of media from Participant C
                Lateness of media from Participant n
        Participant n:
            Vocal range: Undefined
            Opt-out selections
                None
            Latency pathways
                Lateness of media from Participant A
                Lateness of media from Participant B
                Lateness of media from Participant C Based on the available data, the strategizer determines that opt-out requests will be strictly enforced; and then an effort will be made to respect the maximize the "value" of the final collaboration state within a time limit using the available computing resources. The criteria used to measure the success of a collaboration state may be based on a combination of weighted factors where the range of realistic values or outcomes for each parameter is normalized to a range from 0.0 to 1.0:

the aggregate "value" of media played for participants (weight: 0.45);

the number of participants presented with at least two live media streams from other participants (weight: 0.25);

the degree of achieving cohort grouping (weight: 0.2); and the honoring of participant proximity requests (weight: 0.1).

The aggregate "value" of media played for participants may be determined by the media's playback timing accuracy; perfectly synchronized media may be assigned the maximum value, and any media that would play late enough that it would be disruptive may be assigned the minimum value. Media playback values in between the maximum (perfectly synchronized) and minimum (unusably disruptive) may or may not be employed. Media playback values in between the minimum and maximum may represent a range between perfect synchronization and the threshold of acceptability for unsynchronized media playback; the range of in-between values may be scaled in various ways—on an exponential or logarithmic curve, or according to any method of scaling, mapping, or transformation.

In addition to measuring the aggregate "value" of the presented remote media, it may also be useful to evaluate a collaboration state 544 based on how broadly the "value" of presented remote media is distributed across the range of participants. This can be done by counting the number of participants receiving a total value of remote media above a certain threshold, or by counting the number of participants receiving a certain number of remote media elements with a value above a certain threshold or in absolute terms.

Proximity requests may refer to requests made by some participants to be "near" other participants during a collaborative activity. Such proximity requests may be fulfilled by increasing, for the requesting participant, the prominence of the participant requested to be in close proximity. This increased prominence of a remote participant may be accomplished by increasing the remote participant's audio gain; the size, clarity, or prominence of a visual representation of the remote participant; virtual proximity in the three-dimensional representation of a physical and/or acoustic space; by assigning a greater value to the media pathway from the remote participant; through other means; or any combination thereof. Minimum and maximum proximity may be measured in different ways. For example, a range of proximity may be determined to be a virtual physical range of separation of 0.5 meters as a minimum and a distance of 10.0 meters or a virtual distance at which the media from the remote participant would no longer be perceived as a maximum.

Example of criteria used to evaluate a complex multi-layer optimization:

Participant-specific metrics for evaluating collaboration states 544:

Relative value of pathways between participants:

Participant B media to Participant A: 0.8

Participant C media to Participant A: 1.0

Participant D media to Participant A: 0.3

Participant n media to Participant A: 0.5

Participant A media to Participant B: 1.0

Participant C media to Participant B: 1.0

Participant D media to Participant B: 0.0

Participant n media to Participant B: 0.3

Participant A media to Participant C: 1.0

Participant B media to Participant C: 0.0

Participant D media to Participant C: 1.0

Participant n media to Participant C: 0.8

Participant A media to Participant D: 1.0

Participant B media to Participant D: 0.3

[ . . . ]

In the above example, media from participants A and C are given the highest value as these two participants have been designated as leaders. Similarly, the media from participants B to C and from participants D to B are given the lowest value to reflect the opt-out requests. The pathways between participants in cohorts (A, B, and C; and D, E, and n) are assigned a higher priority if they're not already assigned maximum values; and pathways from remote participants not in a participant's cohort may be given a lower value.

At step 356, an initial collaboration state is created by a strategizer. As in the previous example, an initial collaboration state for this optimization may contain a local timing offset for each participant, with each participant's local timing offset representing a time offset from the synchronized time. The default local timing offsets may be set to zero. The other options mentioned in the previous example also apply. In addition to the representation of the relative timing for the media presented to each participant, collaboration states (or at least the final collaboration state) for this optimization may contain data representing additional dimensions of the media production for one or more participant devices and/or media that may be played on one or more participant devices. In some embodiments, a collaboration state may include a definition of derived media sources for participants which may include the original source, relative prominence, 3D position relative to the participant, vocal range, vocal fine pitch adjustment, vocal formant pitch adjustment, a "disambiguation delay" to offset the timing of the derivative from its source to make it easier to disambiguate the derivative from its source, any other production-related parameter(s), or any combination thereof. Descriptions of how one or more parameters of a collaboration state may change or be animated over time, and/or interact with changing circumstances or live data sources available to a participant's device, may also be included as dimensions of a collaboration state.

Example (fragment) of a collaboration state (with optimized values) for a complex multi-layer optimization:

Local timing offsets for participants:

Participant A: 38 ms

Participant B: 14 ms

Participant C: 9 ms

Participant D: 18 ms

Participant n: 27 ms

Derived media sources for participants:

Derived media for Participant A

Source 1: media stream(s) from Participant B

Relative prominence: 0.5

3D Position relative to recipient in meters (x: −1.9, y: +0.05, z: +0.15)

Vocal range: low

Vocal fine pitch adjustment: −12 cents

Vocal formant adjustment: +19 cents

Disambiguation delay: +33 ms

Derived media for Participant C

Source 1: media stream(s) from Participant C (derived media may originate with local participant)
Relative prominence: 0.8
3D Position relative to recipient in meters (x: +2.6, y: −0.09, z: −0.12)
Vocal range: low
Vocal fine pitch adjustment: +16 cents
Vocal formant adjustment: −9 cents
Disambiguation delay: −28 ms
Source 2: media stream(s) from Participant B
Relative prominence: 0.4
3D Position relative to recipient in meters (x: −1.6, y: +0.11, z: −0.03)
Vocal range: high
Vocal fine pitch adjustment: −12 cents
Vocal formant adjustment: +19 cents
Disambiguation delay: 21 ms
Derived media for Participant D
Source 1: media stream(s) from recording #4
Relative prominence: 0.5
3D Position relative to recipient in meters (x: −1.9, y: +0.05, z: +0.15)
Vocal range: low
Vocal fine pitch adjustment:−12 cents
Vocal formant adjustment: +19 cents
Disambiguation delay: 0 ms
Pathways between participants:
Participant B media to Participant A
Relative prominence: 0.50
3D Position relative to recipient in meters (x: +0.6, y: +0.03, z: −0.02)
Participant C media to Participant A
Relative prominence: 0.50
3D Position relative to recipient in meters (x: −1.3, y: +0.04, z: +0.1)
Participant D media to Participant A
Relative prominence: 0.0
3D Position relative to recipient in meters (x: 0.0, y: +0.0, z: −0.0)
Participant n media to Participant A
Relative prominence: 0.42
3D Position relative to recipient in meters (x: +0.9, y: −0.14, z: −0.11)
Participant A media to Participant B
Relative prominence: 0.0
3D Position relative to recipient in meters (x: 0.0, y: +0.0, z: −0.0)
Participant C media to Participant B
Relative prominence: 0.95
3D Position relative to recipient in meters (x: 2.3, y: +0.0, z: −0.20)
Participant D media to Participant B
Relative prominence: 0.3
3D Position relative to recipient in meters (x: 1.1, y: +0.02, z: −0.08)
Participant n media to Participant B
Relative prominence: 0.89
3D Position relative to recipient in meters (x: +0.5, y: +0.04, z: +0.06)
Participant A media to Participant C
Relative prominence: 0.0
3D Position relative to recipient in meters (x: 0.0, y: +0.0, z: −0.0)
Participant B media to Participant C
Relative prominence: 0.95
3D Position relative to recipient in meters (x: 2.3, y: +0.03, z: −0.20)

Participant D media to Participant C
Relative prominence: 0.3
3D Position relative to recipient in meters (x: 1.1, y: +0.05, z: −0.08)
Participant n media to Participant C
Relative prominence: 0.89
3D Position relative to recipient in meters (x: +0.5, y: +0.07, z: +0.06)
Participant A media to Participant D
Relative prominence: 0.0
3D Position relative to recipient in meters (x: 0.0, y: +0.0, z: −0.0)
Participant B media to Participant D
Relative prominence: 0.95
3D Position relative to recipient in meters (x: 2.3, y: +0.03, z: −0.20)
[ . . . ]

At step 358, a strategizer may determine that to produce a successful collaboration defined by a final collaboration state, it may need to repeatedly transform and evaluate successive collaboration states and define evaluation criteria representing the goals for the collaboration as expressed by some expressed preference(s), some environmental data source(s), the system design, or some combination thereof. The strategizer's selection of transforms and evaluations, and their execution order, may somewhat or wholly depend on (or change dynamically based on) the results of successive collaboration state evaluations.

At step 360, a resource manager may identify a single leader device with available computing resources capable of running many transformation and evaluation methods. The resource manager also determines there is enough time to run optimization and evaluation methods on the available computing resources. If the time or computing resources were not available, the system might produce an error, a partially optimized collaboration state, or some other result. In some embodiments, transformation and/or evaluation methods may run in parallel on multiple devices or according to any other method of allocating computing resource across an individual device or across multiple devices.

At step 362, a method coordinator may "schedule" the selected transformation method to be run on a designated "leader" device. At step 364, the selected method runs on the designated leader device. The selected transformation method produces a new collaboration state. At step 366, an evaluation method may be run on the resulting collaboration state. The evaluation results are returned to the strategizer. If the goal criteria has been met, the strategizer determines the collaboration state with the highest value will be the final collaboration state and the optimization may end at step 368. If the goal criteria has not been met, the cycle may start over with the strategizer choosing to run additional optimization methods and evaluations at step 358.

Once the optimization ends at step 368, a state distributor distributes the final collaboration state to participant devices, servers, and/or other production settings generators at step 370. In some embodiments, a state distributor may distribute (to some or all receiving devices) only part of the final collaboration state.

At step 372, each device receiving the final collaboration state may perform additional optimizations. At step 374, each participant device receiving a final collaboration state uses an output producer to collect the media and setup the resources needed to feed to the local device output(s) a mixed media production based on the data specified in the final collaboration state. At step 376, the produced media is sent to the local output devices.

In some embodiments, a strategizer may start a complex multi-layer optimization with the execution of a series of random timing methods each followed by an evaluation method, until the rate of improvement (newly improved evaluations relative to the previous best evaluation) drops below a predetermined threshold, or until time runs out. Then, a soft filter for late media optimization may be run to reduce the prominence of media streams that may interfere with the receiving participant's collaborative experience. Then, a missing participant mitigation transformation method may run to try to "replace" with derivative media— media streams from remote participants that were wanted but filtered because of their potential to interfere. A missing participant mitigation transformation may add new media sources based on existing media transforming multiple dimensions of the collaboration to ensure any derivative media is disambiguated from the original source. For example, a missing stream from a participant with a high voice may be replaced with a derivative media from a source with a low voice with effects applied to change the vocal range, change the pitch and formant to differentiate the new media from that of the original, alter the timing (by adding a delay buffer or adjusting the size of an existing a delay buffer for the media source), and set the spatial position of the original and derived media sources to notably different locations in virtual 3D space. After that, a new series of retiming optimization methods may run to achieve a new collaboration state with an even better result.

Accordingly, the systems and methods discussed herein provide a collaborative experience for each user or participant with individually determined stream selections and local timing offsets such that each participant is able to collaborate in substantial apparent synchronization with one or more additional participants.

In one aspect, the present disclosure is directed to a method for dynamically synchronizing remote media streams. The method includes receiving, by a first computing device, a media stream from each of one or more additional computing devices. The method also includes measuring, by the first computing device, a latency of each received media stream relative to a locally generated media stream. The method also includes identifying, by the first computing device, a first subset of the received media streams having a latency within a predetermined range. The method also includes playing, by the first computing device, the first subset of the received media streams along with the locally generated media stream.

In some implementations, the method includes generating a matrix of latencies between the first computing device and each of the one or more additional computing devices, and identifying media timing offsets for playback of at least the first subset of received media streams based on the generated matrix.

In some implementations, the method includes identifying, by the first computing device, a second subset of the received media streams having a latency less than the predetermined range; storing, by the first computing device in a buffer, the second subset of the received media streams; and playing, by the first computing device, the second subset of the received media streams along with the first subset of the received media streams and the locally generated media stream.

In some implementations, the method includes identifying, by the first computing device, a third subset of the received media streams having a latency greater than the predetermined range but less than a threshold; processing, by the first computing device, each media stream of the third subset according to the latency of the media stream; and playing, by the first computing device, the processed third subset of the received media streams along with the first subset of the received media streams and the locally generated media stream.

In some implementations, the method includes determining, by the first computing device, that a number of media streams in the first subset is below a threshold; and responsive to the determination, playing at least one additional media stream along with the first subset of the received media streams and the locally generated media stream. In a further implementation, the at least one additional media stream is a pre-recorded media stream or a synthetic media stream. In another further implementation, playing the at least one additional media stream further comprises generating the at least one additional media stream from one or more of the locally generated media stream and the received media streams of the first subset. In a still further implementation, generating the at least one additional media stream further comprises, for each media stream of the at least one additional media streams: duplicating a media stream of the one or more of the locally generated media stream and the received media streams of the first subset to generate the additional media stream; and adjusting one or more of a spatial position, speed, pitch, formant, or tone of the additional media stream.

In some implementations, the method includes selecting a media stream for inclusion in the first subset from a second subset of media streams having a latency within the predetermined range, responsive to an association between a first user of the first computing device and a second user of a second computing device providing the selected media stream. In some implementations, the method includes selecting a media stream for inclusion in the first subset from a second subset of media streams having a latency within the predetermined range, responsive to a characteristic associated with the selected media stream being different from a characteristic associated with the locally generated media stream.

In another aspect, the present disclosure is directed to a system for dynamically synchronizing remote media streams. The system includes a first computing device comprising a processor and network interface in communication with one or more additional computing devices via one or more network connections. The processor is configured to: receive, via the network interface, a media stream from each of the one or more additional computing devices; measure a latency of each received media stream relative to a locally generated media stream; identify a first subset of the received media streams having a latency within a predetermined range; and play, via an output device, the first subset of the received media streams along with the locally generated media stream.

In some implementations, the processor is further configured to generate a matrix of latencies between the first computing device and each of the one or more additional computing devices, and identify a stream timing offset for playback of at least the first subset of received media streams based on the generated matrix.

In some implementations, the first computing device further comprises a memory device, and wherein the processor is further configured to: identify a second subset of the received media streams having a latency less than the predetermined range; store, in a buffer of the memory device, the second subset of the received media streams; and play, via the output device, the second subset of the received media streams along with the first subset of the received media streams and the locally generated media stream.

In some implementations, the processor is further configured to: identify a third subset of the received media streams having a latency greater than the predetermined range but less than a threshold; process each media stream of the third subset according to the latency of the media stream; and play, via the output device, the processed third subset of the received media streams along with the first subset of the received media streams and the locally generated media stream.

In some implementations, the processor is further configured to: determine that a number of media streams in the first subset is below a threshold; and responsive to the determination, play at least one additional media stream along with the first subset of the received media streams and the locally generated media stream. In a further implementation, the at least one additional media stream is a pre-recorded media stream or a synthetic media stream. In another further implementation, the processor is further configured to generate the at least one additional media stream from one or more of the locally generated media stream and the received media streams of the first subset. In a still further implementation, for each media stream of the at least one additional media streams, the processor is further configured to generate the at least one additional media stream by: duplicating a media stream of the one or more of the locally generated media stream and the received media streams of the first subset to generate the additional media stream; and adjusting one or more of a spatial position, speed, pitch, formant, or tone of the additional media stream.

In some implementations, the processor is further configured to select a media stream for inclusion in the first subset from a second subset of media streams having a latency within the predetermined range, responsive to an association between a first user of the first computing device and a second user of a second computing device providing the selected media stream.

In some implementations, the processor is further configured to select a media stream for inclusion in the first subset from a second subset of media streams having a latency within the predetermined range, responsive to a characteristic associated with the selected media stream being different from a characteristic associated with the locally generated media stream.

Figure 4:
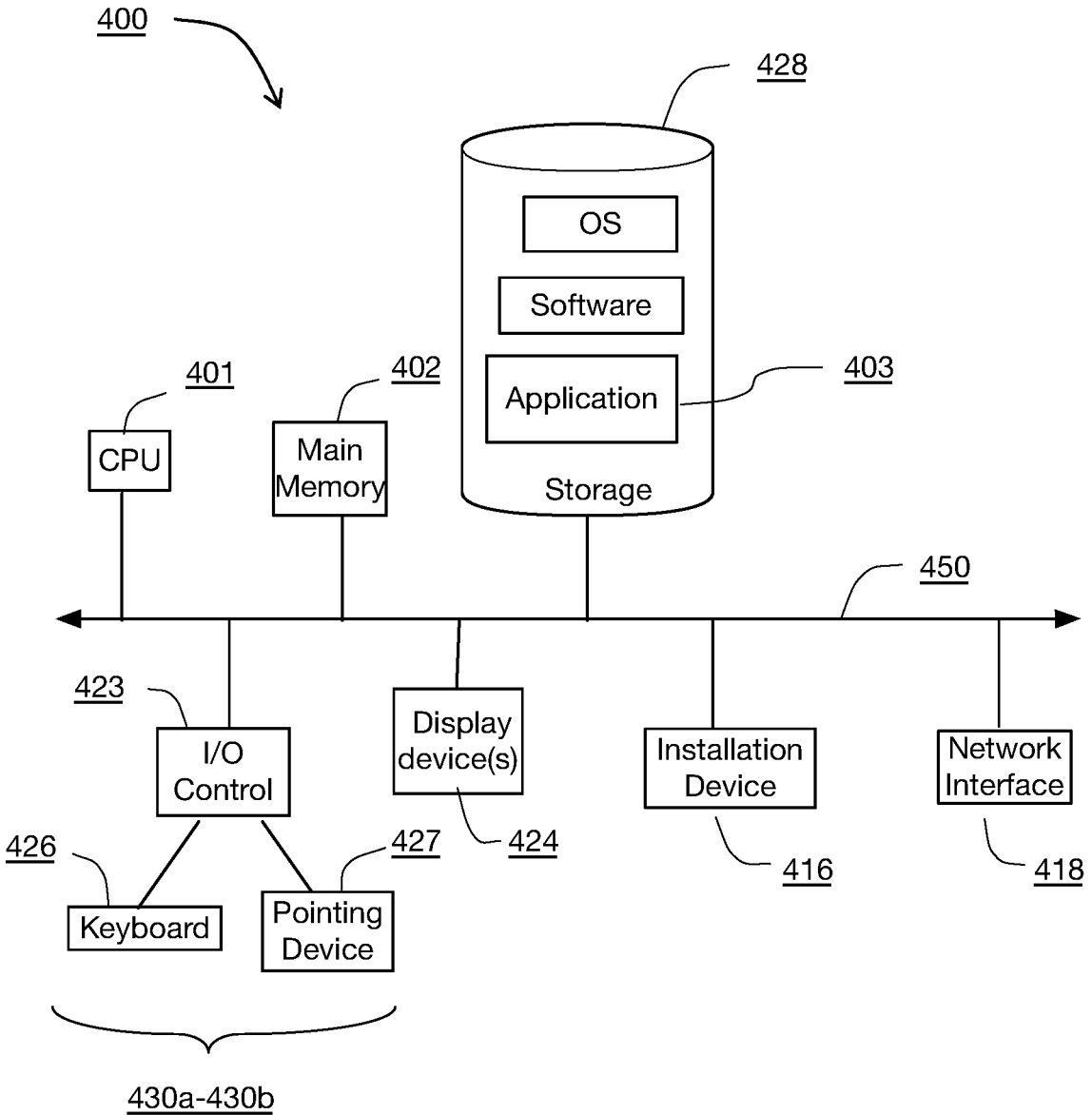
FIG. 4 is a block diagram of an exemplary computing device useful for practicing the methods and systems described herein.

FIG. 4 is a block diagram of an exemplary computing device useful for practicing the methods and systems described herein. The various devices 20, 26, 30, 200, and 230 discussed above may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device.

FIG. 4 depicts a block diagram of a computing device 400 useful for practicing an embodiment of the security devices and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, California; those manufactured by Motorola Corporation of Schaumburg, Illinois; those manufactured by Apple Inc. of Cupertino California, or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a hard-drive or any other device suitable for installing software and programs such as a server or application 403 such as a physical security application, network security application, or combination physical and network security application, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. In some implementations, input and/or output devices may include augmented reality (AR) or virtual reality (VR) systems or headsets, motion trackers, different types of cameras including depth cameras or stereoscopic cameras, infrared cameras, pressure sensors, accelerometers or IMUs, haptic feedback devices or systems, laser or video projection systems, mechanical instruments or devices capable of capturing and/or reproducing movement or sound, animatronics, or any other type and form of device capable of generating a data stream or receiving a data stream and generating physical signals or performing actions. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, California.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, JavaScript, Swift, React, Flutter, or in any byte code language such as JAVA or WebAssembly, or any other type of programming language. The software programs may be stored on or in one or more articles of manufacture as object code.

What is claimed:

1. A method for dynamically synchronizing remote media streams, comprising:

receiving, by a first computing device from each of a plurality of additional computing devices, a corresponding plurality of measurements of communications latency between the additional computing device and each other additional computing device;

determining, by the first computing device for each additional computing device, a local time offset for playback of media streams based on the received plurality of measurements of communications latency; and directing, by the first computing device, each additional computing device to play media streams received from other additional computing devices based on its corresponding local time offset.

2. The method of claim 1, wherein directing each additional computing device to play media streams further comprises directing a second computing device to not play one or media streams received from other additional computing devices after a threshold based on its corresponding local time offset.

3. The method of claim 2, wherein the threshold is the end of a synchronization window based on the local time offset.

4. The method of claim 1, wherein directing each additional computing device to play media streams further comprises directing at least one additional computing device to adjust one or more of spatialization, filtering, compression, attenuation, reverb, pitch, or playback speed of a media stream received from another computing device.

5. The method of claim 1, wherein each local time offset for one or more additional computing devices is dependent on the local time offset for at least one other additional computing device.

6. The method of claim 1, wherein the local time offset for an additional computing device is further based on one or more of a loudness, a vocal characteristic, a social relationship, a geographic location, or a preference of a participant associated with the additional computing device.

7. The method of claim 1, wherein the local time offset for an additional computing device is further based on a stream type associated with the additional computing device.

8. The method of claim 1, further comprising:

generating, by the first computing device, a local media stream; and providing, by the first computing device to a second computing device, the local media stream for playback at a time based on a local time offset determined for the second computing device.

9. The method of claim 8, further comprising:

receiving, by the first computing device from at least one additional computing device, a media stream prior to generation of the local media stream; and delaying playback of the received media stream based on the local time offset determined for the first computing device.

10. The method of claim 9, wherein a first media stream is received at a time $t_1$ prior to a time of generation of the local media stream $t_0$, and wherein a second media stream is received at a time $t_2$ prior to $t_0$; and further comprising:

delaying the first media stream by an amount less than a difference between $t_1$ and $t_0$ based on a relative prominence of the first media stream being greater than a threshold; and delaying the second media stream by an amount greater than a difference between $t_2$ and $t_0$ based on a relative prominence of the second media stream being less than a threshold.

11. The method of claim 1, wherein directing each additional computing device to play the media streams further comprises:

receiving, by the first computing device, the media streams from the additional computing devices; and providing, by the first computing device, at least one media stream of the received media streams to each additional computing device.

12. The method of claim 11, wherein a media stream received from an additional computing device is not provided to that additional computing device.

13. The method of claim 1, wherein directing each additional computing device to play the media streams further comprises:

directing, by the first computing device, each additional computing device to play at least one media stream received by said additional computing device from an additional computing device.

14. The method of claim 1, wherein determining the local time offset for playback of media streams further comprises applying, by the first computing device, a machine learning model trained on historical latency measurements and corresponding manually set offsets to inputs of the plurality of measurements of communications latency.

15. The method of claim 1, wherein the machine learning model is further trained on characteristics of entities corresponding to the historical latency measurements.

16. A system for dynamically synchronizing remote media streams, comprising:

a first computing device comprising one or more processors and one or more network interfaces in communication with one or more additional computing devices via one or more network connections;

wherein the one or more processors are configured to:

receive, from each of a plurality of additional computing devices, a corresponding plurality of measurements of communications latency between the additional computing device and each other additional computing device, determine, for each additional computing device, a local time offset for playback of media streams based on the received plurality of measurements, and direct each additional computing device to play media streams received from other additional computing devices based on its corresponding local time offset.

17. The system of claim 16, wherein the local time offset for an additional computing device is further based on one or more of a loudness, a vocal characteristic, or a social relationship.

18. The system of claim 16, wherein the one or more processors are configured to:

generate a local media stream; and provide, to a second computing device, the local media stream for playback at a time based on a local time offset determined for the second computing device.

19. The system of claim 18, wherein the one or more processors are configured to:

receive, from at least one additional computing device, a media stream prior to generation of the local media stream; and delay playback of the received media stream based on the local time offset determined for the first computing device.

20. A method for dynamically synchronizing remote media streams, comprising:

measuring, by a first computing device, a communications latency between the first computing device and each of a plurality of additional computing devices;

providing, by the first computing device, the measurements to a second computing device;

receiving, by the first computing device from the second computing device, a local time offset based on the provided measurements and communications latency measurements provided by each of the plurality of additional computing devices;

receiving, by the first computing device from an additional computing device, a media stream; and playing, by the first computing device, the media stream at a time based on the local time offset.

21. The method of claim 20, further comprising generating a matrix of latencies between the first computing device and each of the one or more additional computing devices, and identifying a stream offset value for playback of at least the first subset of received media streams based on the generated matrix.

22. The method of claim 20, further comprising playing, by the first computing device, an additional media stream at the time based on the local time offset, the additional media stream comprising a pre-recorded media stream or a synthetic media stream.

23. The method of claim 20, wherein the time based on the local time offset is further based on a prominence of the received media stream.

24. The method of claim 20, wherein the time based on the local time offset is further based on an association between a first user of the first computing device and a second user of the additional computing device.

25. The method of claim 20, further comprising:

receiving, by the first computing device from a third computing device, a media stream; and not playing the media stream received from the third computing device, responsive to the media stream being received at a second time based on the local time offset.

* * * * *